US009395516B2

(12) United States Patent
Katsunuma et al.

(10) Patent No.: US 9,395,516 B2
(45) Date of Patent: Jul. 19, 2016

(54) IMAGING DEVICE

(71) Applicant: Nikon Corporation, Tokyo (JP)

(72) Inventors: Atsushi Katsunuma, Shiraoka (JP); Kenichi Kodama, Mito (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/404,552

(22) PCT Filed: May 23, 2013

(86) PCT No.: PCT/JP2013/003289
§ 371 (c)(1),
(2) Date: Nov. 28, 2014

(87) PCT Pub. No.: WO2013/179620
PCT Pub. Date: Dec. 5, 2013

(65) Prior Publication Data
US 2015/0234150 A1    Aug. 20, 2015

(30) Foreign Application Priority Data

May 28, 2012    (JP) .................................. 2012-120713

(51) Int. Cl.
*G02B 13/00*        (2006.01)
*G02B 5/20*         (2006.01)
(Continued)

(52) U.S. Cl.
CPC .............. *G02B 13/0015* (2013.01); *G02B 5/20* (2013.01); *H04N 5/2254* (2013.01); *H04N 5/23212* (2013.01)

(58) Field of Classification Search
CPC ............. G02B 13/001; G02B 13/0015; G02B 13/002; G02B 13/003; G02B 13/0055; G02B 13/006; G02B 5/20; G02B 3/02; H04N 5/2254; H04N 5/23212; G03C 7/12

USPC .................................................. 348/345–360
See application file for complete search history.

(56) References Cited

U.S. PATENT DOCUMENTS 4,678,332 A * 7/1987 Rock .......................... G01J 3/02
                                                      250/338.5
5,729,011 A    3/1998 Sekiguchi
(Continued)

FOREIGN PATENT DOCUMENTS

CN        102188231 A    9/2011
JP         08-233658 A    9/1996
(Continued)

OTHER PUBLICATIONS

Written Opinion of the International Searching Authority from International Patent Application No. PCT/JP2013/003289, Jul. 16, 2013.
(Continued)

*Primary Examiner* — Pritham Prabhakher
(74) *Attorney, Agent, or Firm* — Shapiro, Gabor and Rosenberger, PLLC

(57) ABSTRACT

Provided is an imaging device (1) having: a front optical system (10) that transmits light from an object; a spectral filter array (20) that transmits light from the front optical system (10) via a plurality of spectral filters; a small lens array (30) that transmits the light from the plurality of spectral filters via a plurality of small lenses respectively, and forms a plurality of object images; a picture element (50) that captures the plurality of object images respectively; and an image processor (60) that determines two-dimensional spectral information on the object images based on image signals output from the picture element (50). The front optical system (10) is configured to transmit the light from the focused object to collimate the light into a parallel luminous flux.

13 Claims, 30 Drawing Sheets

(51) Int. Cl.
*H04N 5/225* (2006.01)
*H04N 5/232* (2006.01)

(56) References Cited

U.S. PATENT DOCUMENTS

| | | | |
|---|---|---|---|
| 5,982,497 A | 11/1999 | Hopkins | |
| 6,016,224 A * | 1/2000 | Namiki | H04N 5/7416 348/E5.139 |
| 6,031,619 A | 2/2000 | Wilkens et al. | |
| 6,222,631 B1 | 4/2001 | Terauchi | |
| 7,242,478 B1 * | 7/2007 | Dombrowski | G01J 3/02 356/419 |
| 7,956,311 B2 * | 6/2011 | Ohno | G01J 3/32 250/201.1 |
| 7,956,924 B2 * | 6/2011 | Georgiev | H04N 5/23212 348/315 |
| 8,290,358 B1 * | 10/2012 | Georgiev | G03B 35/10 396/326 |
| 8,531,581 B2 * | 9/2013 | Shroff | H04N 5/23212 348/335 |
| 8,749,694 B2 * | 6/2014 | Georgiev | H04N 9/045 348/335 |
| 8,817,015 B2 * | 8/2014 | Georgiev | G06T 15/205 345/419 |
| 8,891,170 B2 * | 11/2014 | Tanaka | 359/623 |
| 9,137,441 B2 * | 9/2015 | Shroff | H04N 5/2254 |
| 2002/0089698 A1 | 7/2002 | Inoue et al. | |
| 2006/0250514 A1 | 11/2006 | Inoue et al. | |
| 2007/0132855 A1 * | 6/2007 | Inoue | G02B 27/646 348/208.99 |
| 2011/0181748 A1 * | 7/2011 | Ohnishi | G02B 7/346 348/222.1 |
| 2012/0007997 A1 * | 1/2012 | Oikawa | G03B 13/36 348/208.6 |
| 2012/0127351 A1 * | 5/2012 | Vlutters | G01J 3/02 348/266 |

FOREIGN PATENT DOCUMENTS

| | | |
|---|---|---|
| JP | 2001-036776 A | 2/2001 |
| JP | 2003-295118 A | 10/2003 |
| JP | 2004-198439 A | 7/2004 |
| JP | 2004-344583 A | 12/2004 |
| JP | 2007-295140 A | 11/2007 |

OTHER PUBLICATIONS

International Search Report from International Patent Application No. PCT/JP2013/003289, Jul. 16, 2013.
Partial Supplementary European Search Report issued Dec. 7, 2015, in European Patent Application No. 13797806.0.
Extended Supplementary European Search Report issued Mar. 9, 2016, in European Patent Application No. 13797806.0.

* cited by examiner

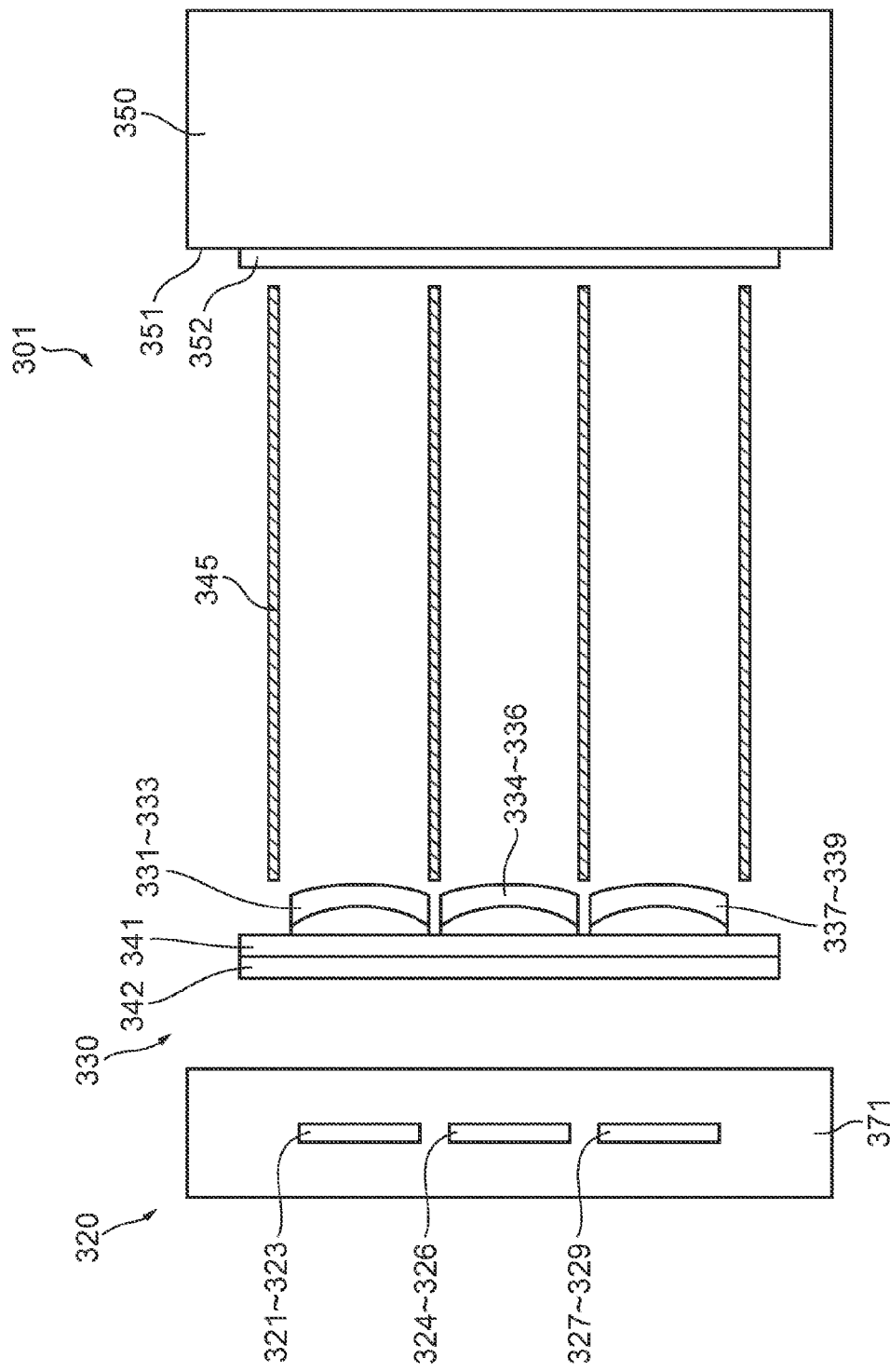

IMAGING DEVICE

TECHNICAL FIELD

The present invention relates to an imaging device that acquires optical information, such as spectrum and Stokes parameter information, in an object image by a single imaging process.

TECHNICAL BACKGROUND

A multi-band camera is an example of an imaging device (e.g. see Patent Document 1). According to an aspect of the multi-band camera, a prism in which a plurality of light refraction planes, having normal lines in different directions with respect to the optical axis of the optical system, is created, is disposed in a position corresponding to an aperture stop of the optical system. By deflecting the plurality of separated luminous flux in different directions respectively using this configuration, object images of the same number as light refraction planes are formed on different image forming positions on an imaging plane for the same object. Different spectral filters, corresponding to the plurality of object images respectively, are disposed immediately after the prism, so that each of the plurality of object images is constituted by predetermined wavelength components. If the plurality of object images constituted by predetermined wavelength components is imaged by a picture element and is image-processed, two-dimensional spectral characteristics of the object can be obtained by a single imaging process.

In such a multi-band camera, the prism is disposed in non-parallel luminous flux, but if the non-parallel luminous flux is deflected by the refraction function of the wedge prism, astigmatism, coma aberration and various other aberrations, including chromatic aberrations caused by the refraction angles which are different depending on the wavelength, are generated, and image quality drops. Furthermore, the projection magnification of the object image is different between the refraction direction and the direction perpendicular to the refraction due to the anamorphic effect by the refraction of the wedge prism, which distorts the object image. Moreover, this distortion generates different optical characteristics depending on a set of a plurality of images, since a plurality of incident planes (refraction planes) of the prims is not parallel, and each luminous flux is deflected in different directions depending on the refraction plane. Therefore if the set of the plurality of images is accurately combined by image processing, different distortion correction processing is required for each set of a plurality of images, which requires more processing. Even if the prism is disposed in parallel luminous flux, problems with chromatic aberrations and distortion of the object image remain, although problems with astigmatism and coma aberration may be solved.

According to an aspect of the multi-band camera, a small lens array is disposed after an intermediate image of the object or immediately after the object image, and a plurality of object images corresponding to a number of small lenses is formed on the image plane. A different spectral filter is disposed in each small lens, and each of the plurality of object images is formed by predetermined wavelength components. The plurality of object images constituted by the predetermined wavelength components is imaged by the picture element and is image-processed, whereby two-dimensional spectral characteristics of the object can be obtained by a single imaging process.

In this multi-band camera, the plurality of object images formed by each small lens in the small lens array has parallax with one another. In the case of disposing the small lens array immediately after the object image, the degree of parallax changes depending on the distance from the object, and these images must be combined by image processing, which requires more processing.

As an aspect of the multi-band camera, a compound eye camera, which uses, as an imaging optical system, only a lens array in which a plurality of lens systems are two-dimensionally arrayed, has been commercialized. In this type of camera, when an object at a near distance is imaged, a difference occurs to the field of view due to major parallax generated among the lenses of the lens array, which makes the edges of the image unusable. A simple method of creating the multi-band camera by arraying a plurality of cameras having identical specifications also has been frequently used, but in the case of this method, focusing must be adjusted for each camera, which is troublesome.

PRIOR ARTS LIST

Patent Document

Patent Document 1: Japanese Laid-Open Patent Publication No. H8-233658 (A)

SUMMARY OF THE INVENTION

Problems to be Solved by the Invention

As described above, a problem of the imaging device, such as a multi-band camera, is that the image processing load is heavy.

With the foregoing in view, it is an object of the present invention to provide an imaging device in which the image processing load is decreased.

Means to Solve the Problems

To achieve this object, an aspect of the present invention provides an imaging device having: a front optical system that transmits light from an object; an optical element array that is constituted by a plurality of optical elements, which is two-dimensionally arrayed along a plane perpendicular to an optical axis, and passes the light from the front optical system via the plurality of optical elements; a small lens array that is constituted by a plurality of small lenses, which is two-dimensionally arrayed along a plane perpendicular to the optical axis and has positive refractive power, that transmits the light from the plurality of optical elements via the plurality of small lenses respectively, and that forms a plurality of object images; a picture element that has an imaging plane on focal planes of the plurality of small lenses, and captures the plurality of object images respectively; and an image processor that determines information on the object images according to optical characteristics of the optical elements, based on image signals output from the picture element, wherein the front optical system transmits the light from the focused object to collimate the light into a parallel luminous flux.

Advantageous Effects of the Invention

According to the present invention, the image processing load can be decreased.

BRIEF DESCRIPTION OF THE DRAWINGS

FIG. 15 is a diagram depicting a general configuration of an imaging device according to Embodiment 4;

DESCRIPTION OF THE EMBODIMENTS

Figure 1:
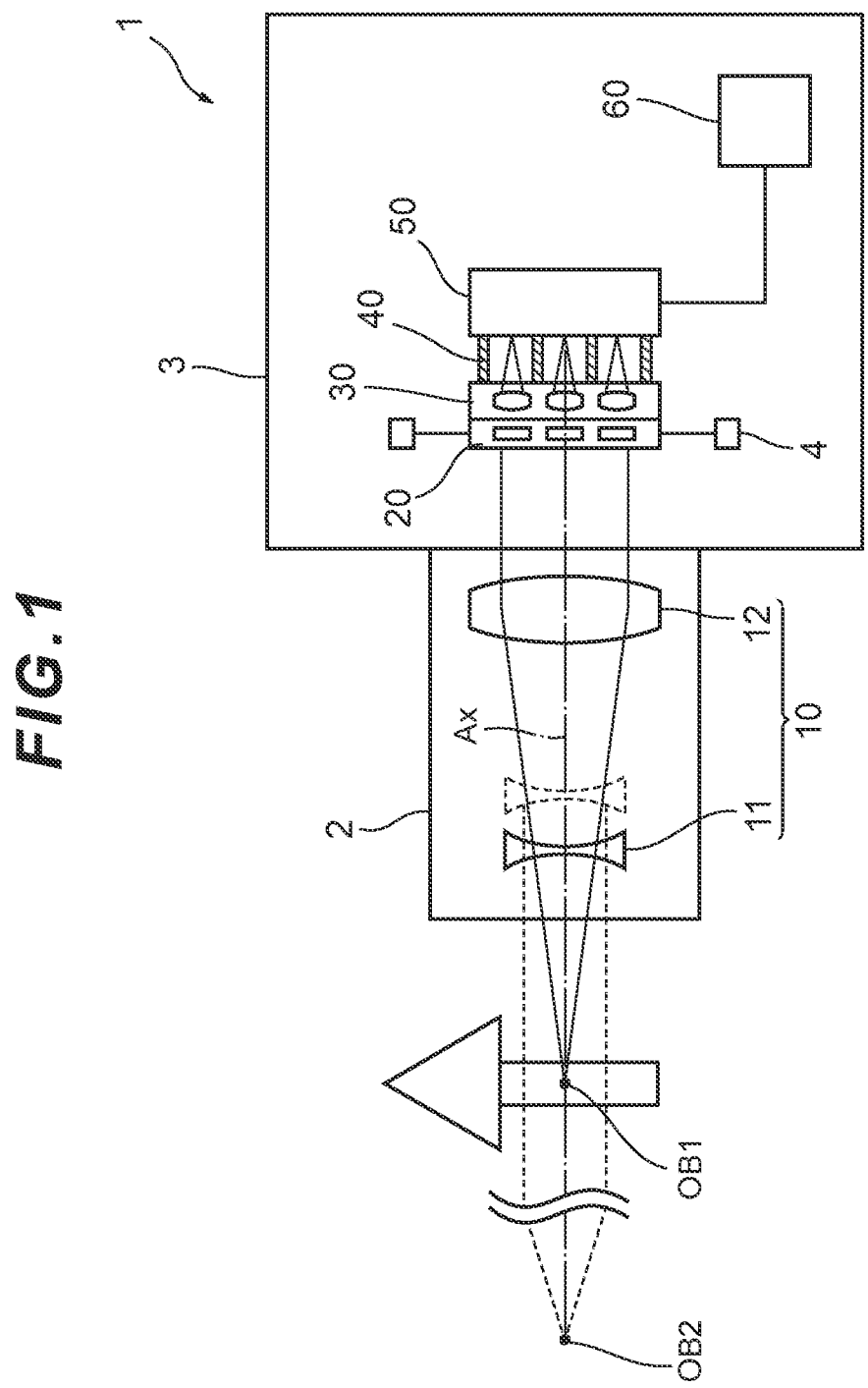
FIG. 1 is a diagram depicting a general configuration of an imaging device according to Embodiment 1.

Preferred embodiments of the present invention will now be described with reference to the drawings. FIG. 1 shows an imaging device 1 according to Embodiment 1. The imaging device 1 of Embodiment 1 has a front optical system 10, a spectral filter array 20, a small lens array 30, a partition member 40, a picture element 50 and an image processor 60. The front optical system 10 is housed inside a lens barrel 2. The spectral filter array 20, the small lens array 30, the partition member 40, the picture element 50 and the image processor 60 are housed inside a camera body 3. The lens barrel 2 that houses the front optical system 10 is detachably/replaceably attached to the camera body 3. Thereby an optimum front optical system 10 can be attached in accordance with the angle of view and the photographing distance of the imaging device 1.

The front optical system 10 is constituted by, in order from an object, a first lens group 11 having negative refractive power and a second lens group 12 having positive refractive power, disposed along the optical axis Ax. The first lens group 11 and the second lens group 12 are schematically drawn as single lenses in FIG. 1, but are normally constituted by a plurality of lenses respectively. The first lens group 11 is a focusing lens group which can move along the optical axis Ax. The second lens group 12, on the other hand, is fixed. The front optical system 10 moves the first lens group 11 along the optical axis Ax so that both luminous flux from an object OB1 located at a finite distance and luminous flux from an object OB2 located at infinity are collimated into a parallel luminous flux when being emitted from the second lens group 12.

Figure 2:
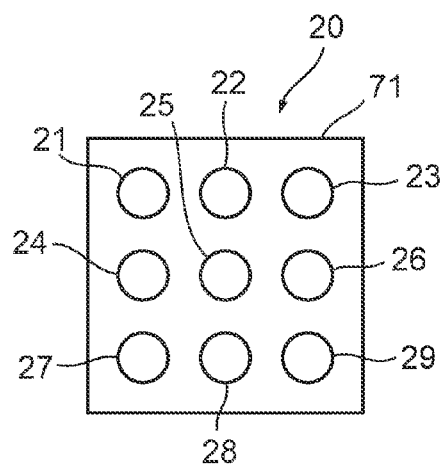
FIG. 2 is a front view of a spectral filter array.
Figure 3:
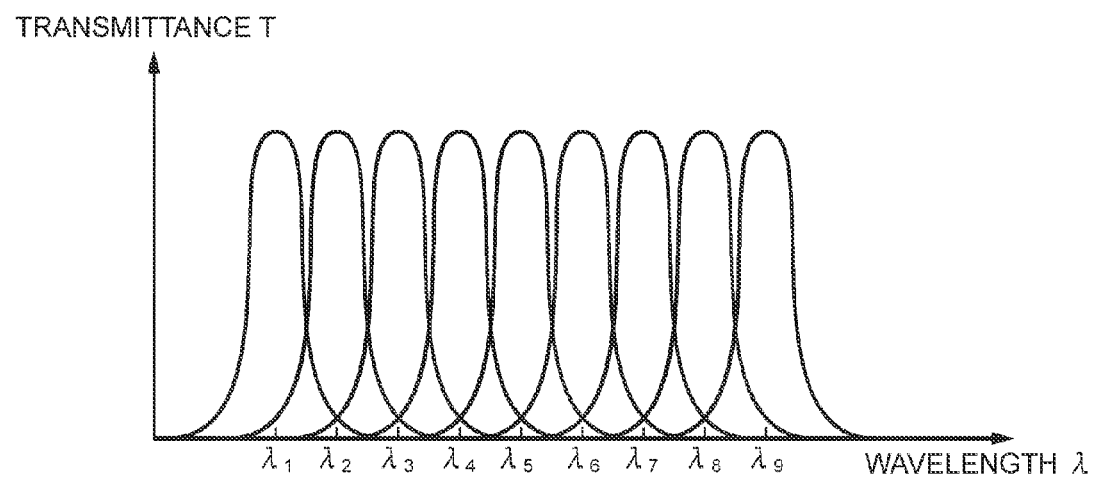
FIG. 3 is a spectral characteristics diagram of a first spectral filter to a ninth spectral filter respectively.

The spectral filter array 20 is disposed on the image side of the front optical system 10 (second lens group 12). As illustrated in FIG. 3, the spectral filter array 20 is constituted by nine spectral filters, that is, first spectral filter 21 to ninth spectral filter 29, which are two-dimensionally arrayed along a plane perpendicular to the optical axis Ax of the front optical system 10, and a holding member 71 that holds these spectral filters. The holding member 71 that holds the spectral filters 21 to 29 is detachably/replaceably attached to a holding mechanism 4 disposed inside the camera body 3. The first spectral filter 21 to the ninth spectral filter 29 are all multi-layer film interference filters. FIG. 2 shows the spectral filter array 20 viewed in the optical axis direction. The parallel luminous flux emitted from the front optical system 10 is irradiated onto each spectral filter 21 to 29 without shading. The spectral characteristics of the spectral filters 21 to are all different from one another. FIG. 3 shows all the transmission spectral characteristics of the spectral filters 21 to 29. As FIG. 3 shows, the first spectral filter 21 to the ninth spectral filter 29 are band-pass filters of which center wavelengths are nine types of equally spaced wavelengths, from the first wavelength $\lambda 1$ to the ninth wavelength $\lambda 9$.

Figure 4:
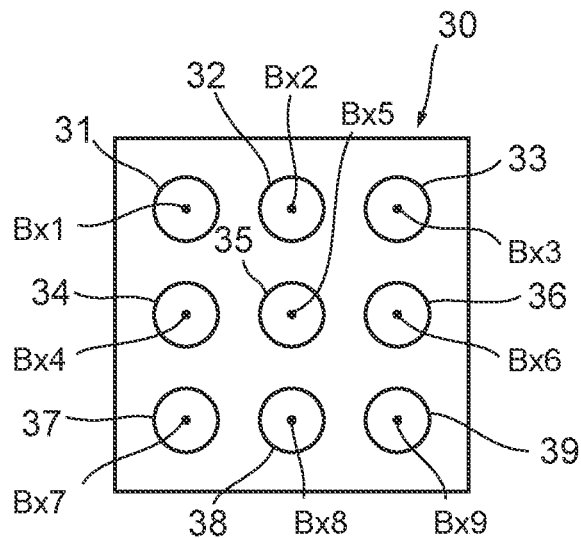
FIG. 4 is a front view of a small lens array.

The small lens array 30 is disposed on the image side of the spectral filter array 20. As illustrated in FIG. 4, the small lens array 30 is constituted by nine small lenses (first small lens 31 to ninth small lens 39) which all have positive refractive power and have the same specifications, and are smaller than the picture element 50. The first small lens 31 to the ninth small lens 39 have sizes similar to those of the first spectral filter 21 to the ninth spectral filter 29, and are two-dimensionally arrayed along a plane perpendicular to the optical axis Ax of the front optical system 10. The first small lens 31 to the ninth small lens 39 are aligned in the optical axis direction, so that each focal plane with respect to an object at infinity comes to the same plane perpendicular to the optical axis Ax. FIG. 4 shows the small lens array 30 viewed in the optical axis direction.

The positions are corresponded respectively as: the first small lens 31 to the first spectral filter 21; the second small lens 32 to the second spectral filter 22; the third small lens 33 to the third spectral filter 23; the fourth small lens 34 to the fourth spectral filter 24; the fifth small lens 35 to the fifth spectral filter 25; the sixth small lens 36 to the sixth spectral filter 26; the seventh small lens 37 to the seventh spectral filter 27; the eighth small lens 38 to the eighth spectral filter 28; and the ninth small lens 39 to the ninth spectral filter 29. The first small lens 31 to the ninth small lens 39 receive the luminous flux that transmitted through the first spectral filter 21 to the ninth spectral filter 29 respectively, and independently form an image of an object at a finite distance OB1 or an image of an object at infinity OB2.

Figure 5:
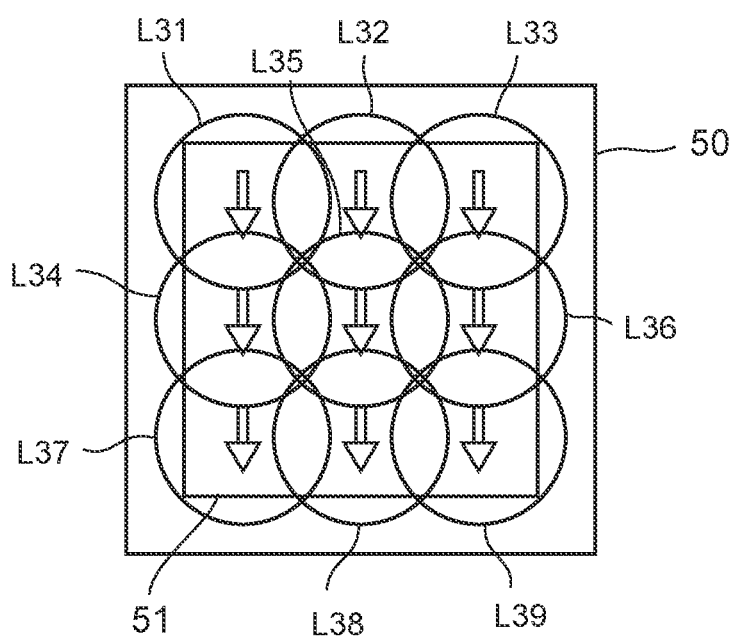
FIG. 5 is a schematic diagram depicting image forming luminous flux on an image plane when a partition member does not exist.

The picture element 50 is disposed on the image side of the small lens array 30. The partition member 40 is disposed between the small lens array 30 and the picture element 50. As illustrated in FIG. 5, the picture element 50 has a rectangular imaging plane 51 where a plurality of imaging pixels are two-dimensionally arrayed on a plane. The imaging plane 51 is disposed on a focal plane of each small lens 31 to 39, and a first image forming luminous flux L31 to a ninth image forming luminous flux L39 are irradiated from the first small lens 31 to the ninth small lens 39 respectively onto the imaging plane 51.

Figure 6:
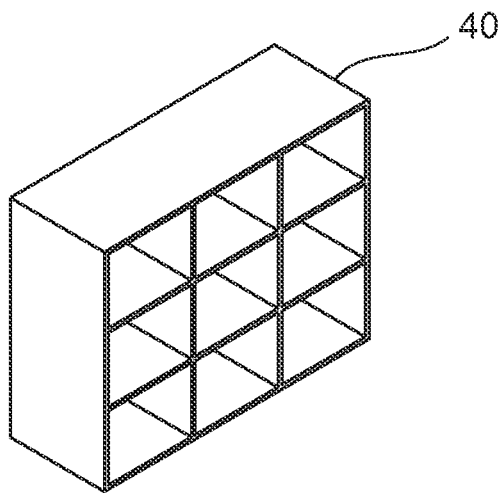
FIG. 6 is a perspective view of the partition member.
Figure 7:
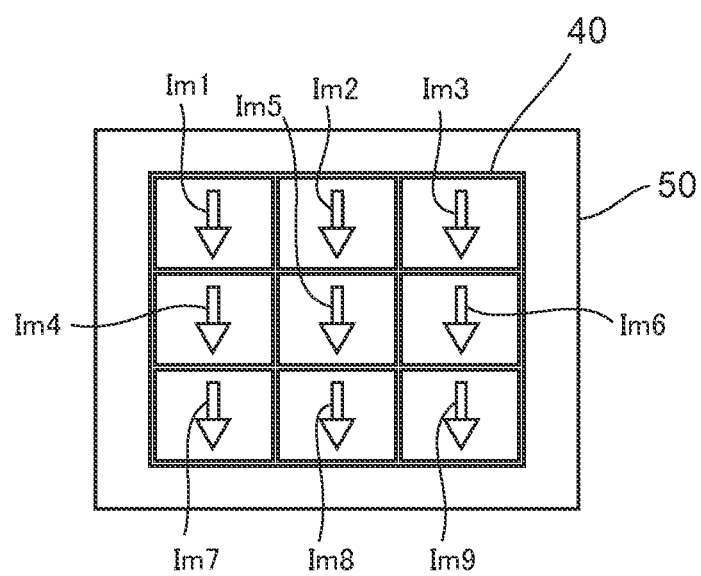
FIG. 7 is a schematic diagram depicting an object image on the imaging plane when the partition member exists.

If the partition member 40 were not disposed, the first image forming luminous flux L31 to the ninth image forming luminous flux L39 would overlap with one another on the imaging plane 51, as illustrated in FIG. 5. Therefore the partition member 40 is disposed contacting with the imaging plane 51, as illustrated in FIG. 1. The partition member 40 is formed in a lattice shape having nine rectangular openings, as illustrated in FIG. 6, so that each opening corresponds to each of the first small lens 31 to the ninth small lens 39 respectively one-on-one. By disposing the partition member 40 in close contact with the imaging plane 51, overlapping among the first image forming luminous flux L31 to the ninth image forming luminous flux L39, as shown in FIG. 5, is solved, and nine object images Im1 to Im9 are separately formed on the imaging plane 51 by the first small lens 31 to the ninth small lens 39, as illustrated in FIG. 7. The surface of the partition member 40 is treated to prevent reflection of the light (e.g. blackened).

The picture element 50 captures nine object images Im1 to Im9 formed on the imaging plane 51, and outputs the image signals thereof to the image processor 60. The image processor 60 generates a multi-wavelength band image of an object at a finite distance OB1 or an object at infinity OB2 (that is, the two-dimensional spectral characteristics information of an object in a predetermined wavelength range), based on the image signals of the object images Im1 to Im9 in accordance with the spectral characteristics of each spectral filter 21 to 29 output from the picture element 50.

Figure 8:
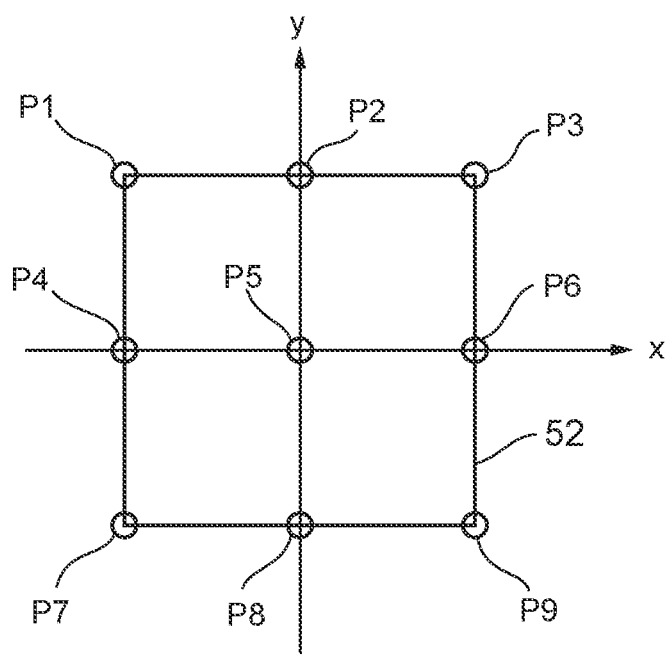
FIG. 8 is a schematic diagram depicting intersections of a center axis of the small lenses and imaging pixels.

The imaging plane 51 is constituted by a plurality of imaging pixels, and FIG. 8 shows the locations of intersections in the imaging pixel with each center axis B×1 to B×9 of the first small lens 31 to the ninth small lens 39 (see FIG. 4). The imaging pixel is rectangular. FIG. 8 shows how to set the xy coordinates with respect to the imaging pixel 52, and the positions of the nine intersections P1 to P9, that is, intersection P1 with the center axis B×1 of the first small lens 31 to the intersection P9 with the center axis B×9 of the ninth small lens 39. The imaging pixel 52 shown in FIG. 8 is a virtual imaging pixel representing the nine imaging pixels superposed on one another, in order to illustrate all the intersections P1 to P9 on one imaging pixel.

As illustrated in FIG. 8, the first small lens 31 to the ninth small lens 39 are arrayed so that all of the nine intersections P1 to P9 have different sets of xy coordinate values from one another. Therefore all the nine object images Im1 to Im9 formed by the first small lens 31 to the ninth small lens 39 respectively are formed to have different shifting modes from the imaging pixel array on the imaging plane 51. In this embodiment, each object image Im1 to Im9 is captured by the picture element 50 in a state where each object image shifts into three positions respectively from the imaging pixel 52, in the vertical, horizontal or diagonal direction.

In the imaging device 1 of Embodiment 1, an object at a finite distance OB1 or an object at infinity OB2 is focused by moving the first lens group 11 along the optical axis Ax using a lens drive device (not illustrated). An operation when the object at a finite distance OB1 is focused will be described. The operation in the case when the object at infinity OB2 is focused is the same as the case when the object at a finite distance OB1 is focused, therefore description thereof is omitted.

Luminous flux from the focused object at a finite distance OB1 transmits through the first lens group 11 and the second lens group 12, and is collimated into a parallel luminous flux when emitted from the second lens group 12. The parallel luminous flux emitted from the front optical system 10 passes one of the first spectral filter 21 to the ninth spectral filter 29 of the spectral filter array 20, and reaches the small lens array 30. Each of the first small lens 31 to the ninth small lens 39 of the small lens array 30 receives the luminous flux that passed the first spectral filter 21 to the ninth spectral filter 29 respectively, and forms an image of the object at a finite distance OB1 independently from one another.

The luminous flux from the focused object at a finite distance OB1 has been collimated into a parallel luminous flux when entering the spectral filter array 20 by the focusing operation of the first lens group 11 (focusing lens group), hence all of the nine object images formed by the small lenses 31 to 39 are positioned on the same plane (focal plane). Further, the incident angle of the light to the spectral filter array 20 does not change depending on the distance to the object, hence the spectral characteristics of each spectral filter 21 to 29 does not change depending on the distance to the object. The change of spectral transmission characteristics caused by a change in the incident angle of the light to the spectral filter array 20, depending on the angle of view, is corrected in advance.

Because of the function of the front optical system 10, the object at a finite distance OB1, as if the object OB1 exists at infinity when viewed from the small lens array 30. Therefore no parallax is generated among the nine images of the object at a finite distance OB1 formed by the first small lens 31 to the ninth small lens 39 respectively.

The nine object images Im1 to Im9 formed on the imaging plane 51 (see FIG. 7) are generated with spectral characteristics corresponding to the first spectral filter 21 to the ninth spectral filter 29 respectively. The picture element 50 captures the nine object images Im1 to Im9 formed on the imaging plane 51, and outputs the image signals thereof to the image processor 60. Based on the image signals of the object images Im1 to Im9 according to the spectral characteristics of each spectral filter 21 to 29, output from the picture element 50, the image processor 60 generates a multi-wavelength band image of the object at a finite distance OB1.

At this time, the picture element 50 captures each object image Im1 to Im9 in a state of shifting into three positions in the vertical, horizontal or diagonal direction respectively from the imaging pixel 52 (see FIG. 8). The image processor 60 performs predetermined image processing based on the image signal of each object image Im1 to Im9 acquired in a state of shifting into three positions in the vertical, horizontal or diagonal position respectively from the imaging pixel 52, whereby resolution information on spatial frequency, which is higher than the Nyquist frequency determined by the imaging size, can be obtained.

According to Embodiment 1, the small lens array 30 is disposed in the parallel luminous flux from the front optical system 10, therefore parallax is not generated among the object images which are formed by each small lens 31 to 39. As a result, image processing for the object image becomes easier, and image processing load can be decreased. Moreover, the range of the field of view does not shift among the plurality of captured object images, hence a dead angle is not generated and image information can be used efficiently.

The front optical system 10 is constituted by the first lens group 11 and the second lens group 12, where the first lens group 11 is the focusing lens group. Because of this, there is no deflection in the optical system due to the refraction by the prism, hence generation of various aberrations, such as astigmatism, coma aberration and chromatic aberration, and distortion of the image, caused by the refraction function of the prism, can be prevented. Furthermore, the focal adjustment mechanism (focusing mechanism) is required only at one location, which makes it possible to perform fast focusing equivalent to standard cameras.

Further, the partition member 40 is disposed between the small lens array 30 and the picture element 50. Because of this, the image forming luminous fluxes L31 to L39 from the small lenses 31 to 39 do not overlap with one another on the imaging plane 51, therefore cross-talk among the object images in the picture element 50 can be prevented.

Further, as the optical element array, the spectral filter array 20 is detachably held by the holding mechanism 4. Thereby the two-dimensional spectral characteristics of the object can be obtained by a single imaging process without applying load to the image processing. Moreover, the spectral filter array 20 can be replaced with a unit having different optical characteristic specifications, such as a different transmission wavelength of the band-pass filter (in each spectral filter 21 to 29).

Further, the front optical system 10 is detachably held by the lens barrel 2. Since the front optical system can be replaced with a unit having a different magnification, imaging field of view can be changed.

Further, the relative positional relationship between the center axis Bx1 to Bx9 of each small lens 31 to 39 and the imaging pixel (pixel of the picture element 50), with which this center axis Bx1 to Bx9 intersects, differs depending on the small lens. Thereby the imaging pixel array (pixel array) to capture a plurality of object images formed by the plurality of small lenses 31 to 39 shifts in each object image, hence a super-resolution image having a resolution higher than the Nyquist frequency can be obtained by image-processing the image signal of the plurality of acquired object images.

In Embodiment 1, the first lens group 11 is the focusing lens group, but the present invention is not limited to this. For example, the second lens group 12 may be the focusing lens group, or both the first lens group 11 and the second lens group 12 may be the focusing lens group. The front optical system 10 may be a single focus lens of which focal length is fixed, or may be a zoom lens of which focal length is variable.

In Embodiment 1, the front optical system 10 is constituted by, in order from the object along the optical axis Ax, the first lens group 11 having negative refractive power, and the second lens group 12 having positive refractive power, but the present invention is not limited to this. For example, the positions of the first lens group 11 having negative refractive power and the second lens group 12 having positive refractive power may be reversed. The front optical system may be constituted by, in order from the object, a first lens group having positive refractive power, a second lens group having negative refractive power, and a third lens group having positive refractive power, where the second lens group is configured to be the focusing lens group. Furthermore, the front optical system may be constituted by, in order from the object, a first lens group having positive refractive power, a second lens group having negative refractive power, a third lens group having negative refractive power, and a fourth lens group having positive refractive power, where the second lens group and the fourth lens group are configured to be the focusing lens group.

Figure 9:
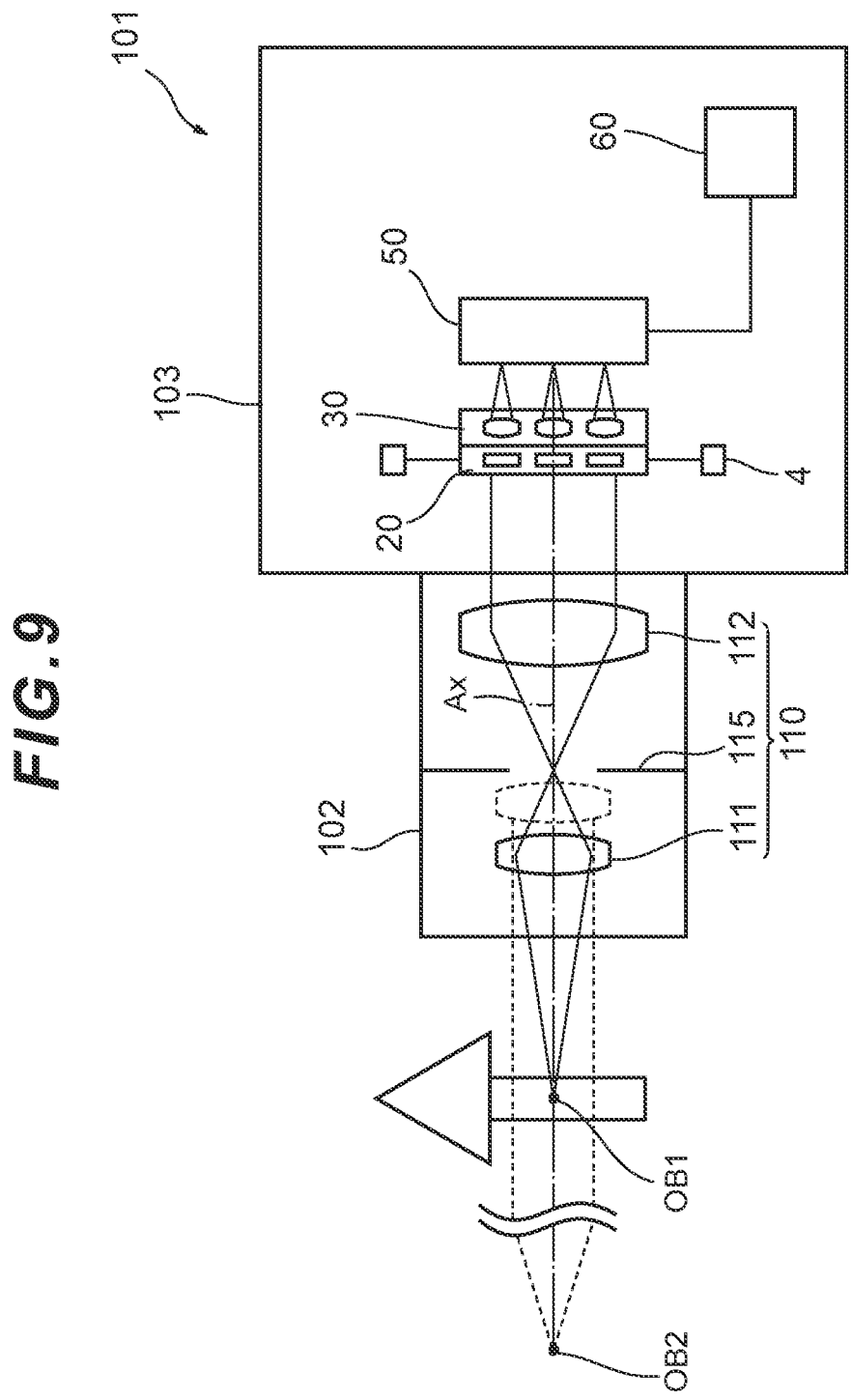
FIG. 9 is a diagram depicting a general configuration of an imaging device according to Embodiment 2.

Now Embodiment 2 of the imaging device will be described with reference to FIG. 9. The imaging device 101 of Embodiment 2 has a front optical system 110, a spectral filter array 20, a small lens array 30, a picture element 50 and an image processor 60. In Embodiment 2, the spectral filter array 20, the small lens array 30, the picture element 50 and the image processor 60 have configurations similar to those of Embodiment 1, and are denoted with the same reference numerals as Embodiment 1, for which detailed description is omitted.

The front optical system 110 is housed inside a lens barrel 102. The spectral filter array 20, the small lens array 30, the picture element 50 and the image processor 60, on the other hand, are housed inside a camera body 103. The lens barrel 102 that houses the front optical system 110 is detachably/replaceably attached to the camera body 103. Thereby an optimum front optical system 110 can be attached in accordance to the angle of view and the photographing distance of the imaging device 101.

The front optical system 110 is constituted by, in order from the object along the optical axis Ax, a first lens group 111 having positive refractive power, and a second lens group 112 having positive refractive power. The first lens group 111 and the second lens group 112 are schematically drawn as single lenses in FIG. 9, but normally are constituted by a plurality of lenses respectively. The first lens group 111 is a focusing lens group which can move along the optical axis Ax, and forms an intermediate image of a focused object at a finite distance OB1 or object at infinity OB2, in a predetermined position (hereafter called "intermediate image forming position") inside the front optical system 110. The second lens group 112, on the other hand, is fixed, and collimates the luminous flux from the first lens group 111, which forms the intermediate image, into a parallel luminous flux, and allows the parallel luminous flux to enter the spectral filter array 20.

Similarly to Embodiment 1, the spectral filter array 20 is disposed on the image side of the front optical system 110 (second lens group 112), and the small lens array 30 is disposed on the image side of the spectral filter array 20. The picture element 50 is disposed on the image side of the small lens array 30.

Figure 10:
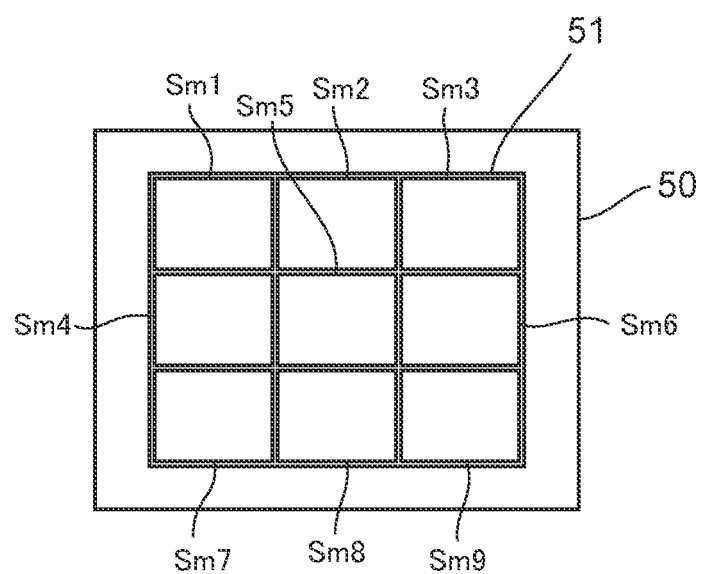
FIG. 10 is a schematic diagram depicting an effect of a field stop on an imaging plane.

A field stop 115 is disposed in the intermediate image forming position in the front optical system 110. The field stop 115 has a rectangular opening similar to the shape of the imaging plane 51. The second lens group 112 and the small lens array 30 (small lenses 31 to 39) form nine field stop images (object images of which field of view is limited by the field stop 115) on the imaging plane 51, that is, the first field stop image Sm1 to the ninth field stop image Sm9 as shown in FIG. 10. The projection magnification of the aperture stop 115 by the second lens group 112 and the small lens array 30 is determined such that the first field stop image Sm1 to the ninth field stop image Sm9 have sizes that do not overlap with one another. Since the object images formed by the first small lens 31 to the ninth small lens 39 are partitioned by the first field stop image Sm1 to the ninth field stop image Sm9, the similar effect as the case of disposing the partition member 4 in Embodiment 1 can be obtained.

In the imaging device 101 of Embodiment 2, an object at a finite distance OB1 or an object at infinity OB2 is focused by moving the first lens group 111 by a lens drive device (not illustrated) along the optical axis Ax. An operation when the object at a finite distance OB1 is focused will be described. The operation in the case of focusing on the object at infinity OB2 is the same as the case of focusing on the object at a finite distance OB1, therefore description thereof is omitted.

The luminous flux from the focused object at a finite distance OB1 transmits through the first lens group 111 and the second lens group 112, and becomes parallel luminous flux when emitted from the second lens group 112. The parallel luminous flux emitted from the front optical system 10 passes one of the first spectral filter 21 to the ninth spectral filter 29 of the spectral filter array 20 and reaches the small lens array 30. Each of the first small lens 31 to the ninth small lens 39 of the small lens array 30 receives the luminous flux that passed the first spectral filter 21 to the ninth spectral filter 29 respectively, and forms an image of the object at a finite distance OB1 independently from one another.

The luminous flux from the focused object at a finite distance OB1 has been collimated into a parallel luminous flux when entering the spectral filter array 20 by the focusing operation of the first lens group 111 (focusing lens group), hence all of the nine object images formed by the small lenses 31 to 39 are positioned on the same plane (focal plane). Further, because of the function of the front optical system 110, the object at a finite distance OB1 looks as if the object OB1 exists at infinity when viewed from the small lens array 30. Therefore, similarly to Embodiment 1, no parallax is generated among the nine images of the object at a finite distance OB1 formed by the first small lens 31 to the ninth small lens 39 respectively.

The nine object images formed on the imaging plane 51 (first field stop image Sm1 to the ninth field stop image Sm9) are generated with spectral characteristics corresponding to the first spectral filter 21 to the ninth spectral filter 29 respectively. The picture element 50 captures the nine object images formed on the imaging plane 51 (first field stop image Sm1 to the ninth field stop image Sm9), and outputs the image signals thereof to the image processor 60. Based on the image signals of the object images according to the spectral characteristics of each spectral filter 21 to 29, output from the picture element 50, the image processor 60 generates a multi-wavelength band image of the object at a finite distance OB1.

At this time, the picture element 50 captures each object image (first field stop image Sm1 to the ninth field stop image Sm9) in a state of shifting into three positions in the vertical, horizontal or diagonal direction respectively from the imaging pixel 52 (see FIG. 8). The image processor 60 performs predetermined image processing based on the image signal of each object image acquired in a state of shifting into three positions in the vertical, horizontal or diagonal direction respectively from the imaging pixel 52, whereby resolution information on the spatial frequency, which is higher than the Nyquist frequency determined by the imaging size, can be obtained.

According to Embodiment 2, an effect similar to Embodiment 1 can be obtained. In Embodiment 2, the field stop 115 is disposed in the intermediate image forming position in the front optical system 110. Because of this, the image forming luminous flux from the small lenses 31 to 39 do not overlap with one another on the imaging plane 51, therefore cross-talk among the object images in the picture element 50 can be prevented. Furthermore, the first lens group 111 located on the object side of the field stop 115 in the front optical system 110 is the focusing lens group. This means that disposing the focal adjustment mechanism (focusing mechanism) is required at only one location, which makes it possible to perform fast focusing equivalent to standard cameras.

In Embodiment 2, in addition to the field stop 115, the partition member 40 of Embodiment 1 may be disposed between the small lens array 30 and the picture element 50. Thereby the cross-talk among the object images on the picture element 50 can be prevented with even higher certainty. The partition member 40 of Embodiment 1 may be disposed between the small lens array 30 and the picture element 50 without disposing the field stop 115.

In Embodiment 2, the first lens group 111 is the focusing lens group, but the present invention is not limited to this. For example, the second lens group 112 may be the focusing lens group, or both the first lens group 111 and the second lens group 112 may be the focusing lens group. The front optical system 110 may be a single focus lens of which focal length is fixed, or may be a zoom lens of which focal length is variable.

Figure 11:
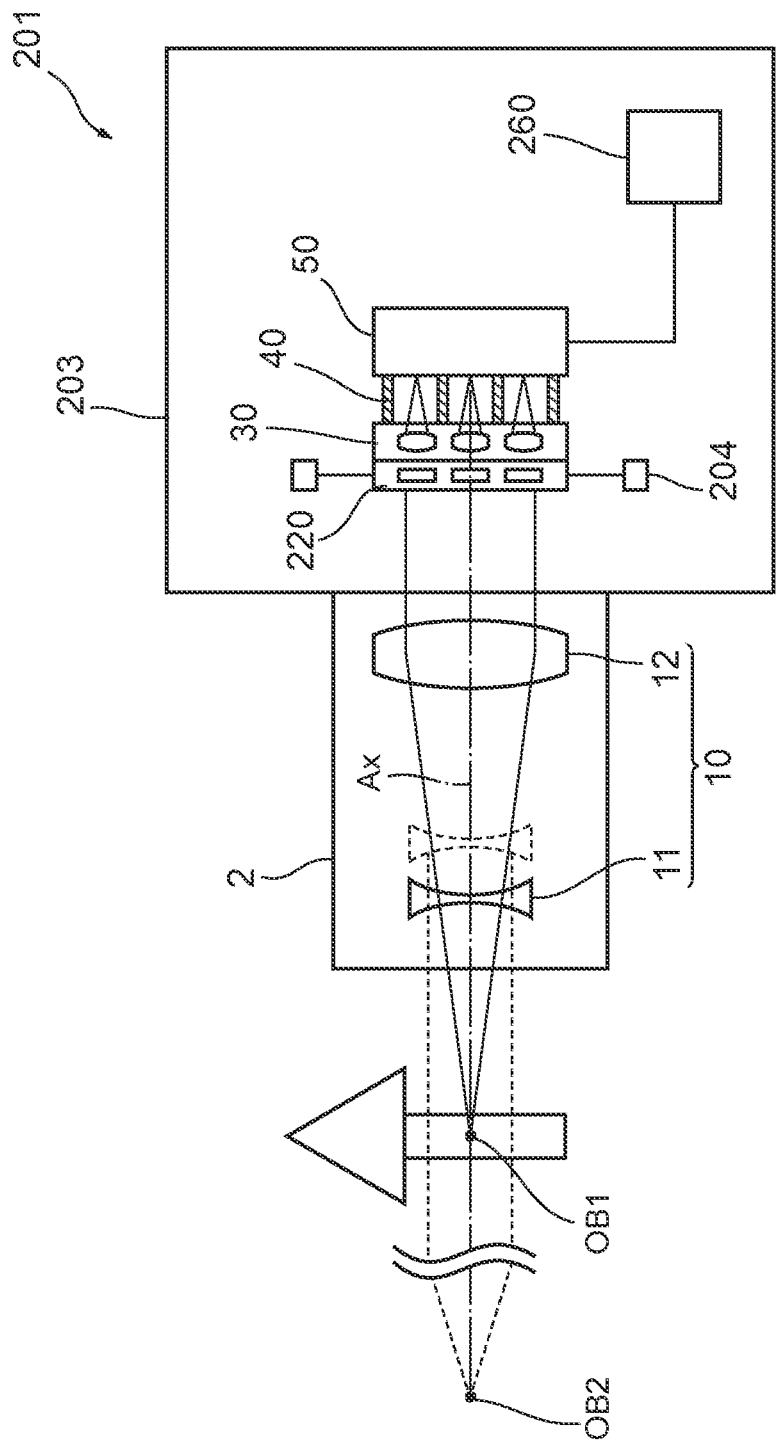
FIG. 11 is a diagram depicting a general configuration of an imaging device according to Embodiment 3.

Now Embodiment 3 of the imaging device will be described with reference to FIG. 11. The imaging device 201 of Embodiment 3 has a front optical system 10, an optical element array 220, a small lens array 30, a partition member 40, a picture element 50 and an image processor 260. The imaging device 201 of Embodiment 3 is a multi-image camera that obtains the Stokes parameters of the object image for two wavelength bands. In Embodiment 3, the front optical system 10, the small lens array 30, the partition member 40 and the picture element 50 have configuration similar to those of Embodiment 1, therefore are denoted with the same reference numerals as those in Embodiment 1, for which detailed description is omitted.

The front optical system 10 is housed inside a lens barrel 2, which is similar to that of Embodiment 1. The optical element array 220, the small lens array 30, the partition member 40, the picture element 50 and the image processor 260, on the other hand, are housed inside a camera body 203. The lens barrel 2 that houses the front optical system 10 is detachable/replaceably attached to the camera body 203. Thereby an optimum front optical system 10 can be attached in accordance with the angle of view and the photographing distance of the imaging device 201.

Figure 12:
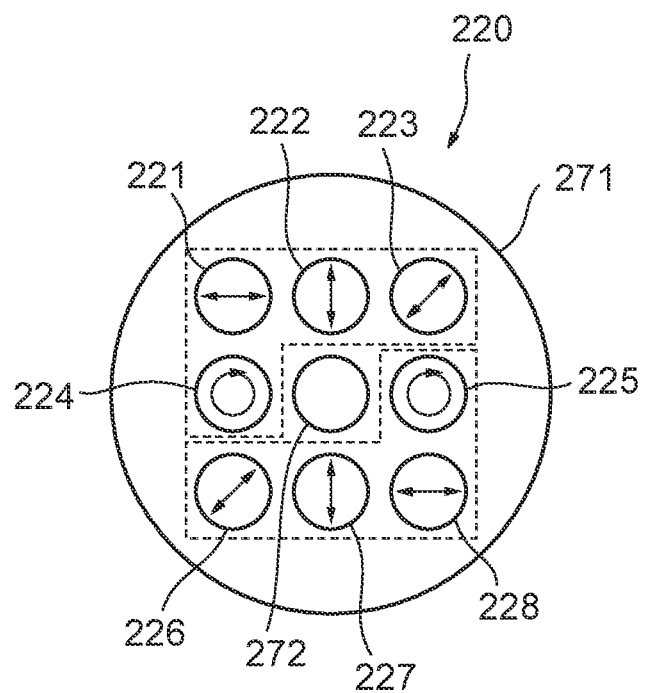
FIG. 12 is a front view of an optical element array.

The optical element array 220 is disposed on the image side of the front optical system 10 (second lens group 12). As illustrated in FIG. 12, the optical element array 220 is constituted by eight optical elements (first optical element 221 to eighth optical element 228), which are two-dimensionally arrayed along a plane perpendicular to the optical axis Ax of the front optical system 10, and is held by a holding member 271. The holding member 271 that holds the optical elements 221 to 228 is detachably/replaceably attached to a holding mechanism 204 disposed inside the camera body 203. FIG. 12 shows the optical element array 220 viewed in the optical axis direction. The parallel luminous flux emitted from the front optical system 10 is irradiated onto each optical element 221 to 228 without shading.

The first optical element 221, the second optical element 222, the third optical element 223 and the fourth optical element 224 are optical elements for the first wavelength band. The first optical element 221 passes only linearly polarized light, of which polarizing direction is horizontal in FIG. 12 (hereafter called "first linearly polarized light"). The second optical element 222 passes only linearly polarized light, of which polarizing direction is vertical in FIG. 12 (hereafter called "second linearly polarized light"). The polarizing direction of the second linearly polarized light is perpendicular to the first linearly polarized light. The third optical element 223 passes only linearly polarized light, of which polarizing direction is 45° in FIG. 12 (hereafter called "third linearly polarized light"). The polarizing direction of the third linearly polarized light is inclined 45° from the first linearly polarized light and the second linearly polarized light. The fourth optical element 224 passes only circularly polarized light in the first wavelength band.

The fifth optical element 225, the sixth optical element 226, the seventh optical element 227 and the eighth optical element 228 are optical elements for a second wavelength band. The fifth optical element 225 passes only circularly polarized light in the second wavelength band. The sixth optical element 226 passes only linearly polarized light of which polarizing direction is 45° in FIG. 12 (third linearly polarized light in the second wavelength band). The seventh optical element 227 passes only linearly polarized light of which polarizing direction is vertical in FIG. 12 (second linearly polarized light in the second wavelength band). The eighth optical element 228 passes only linearly polarized light of which polarizing direction is horizontal in FIG. 12 (first linearly polarized light in the second wavelength band). No optical element is disposed in a center hole 272 formed at the center of the holding member 271, and this hole is used for capturing an object image which is not modulated.

Figure 13:
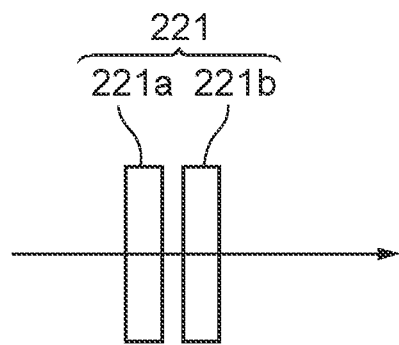
FIG. 13 is a side view of a first optical element.

As illustrated in FIG. 13, the first optical element 221 is constituted by, in order along the light traveling direction, a polarizing filter 221a of which direction of the transmission axis has been adjusted so as to pass only the first linearly polarized light, and a band-pass filter 221b which passes only the first linearly polarized light in the first wavelength band. The second optical element 222 is constituted by, in order along the light traveling direction, a polarizing filter of which direction of the transmission axis has been adjusted so as to pass only the second linearly polarized light, and a band-pass filter that passes only the second linearly polarized light in the first wavelength band. The third optical element 223 is constituted by, in order along the light traveling direction, a polarizing filter of which direction of the transmission axis has been adjusted so as to pass only the third polarized light, and a band-pass filter which passes only the third linearly polarized light in the first wavelength band. The second optical element 222 and the third optical element 223 have configurations similar to that of the first optical element 221, therefore detailed illustration is omitted.

Figure 14A:
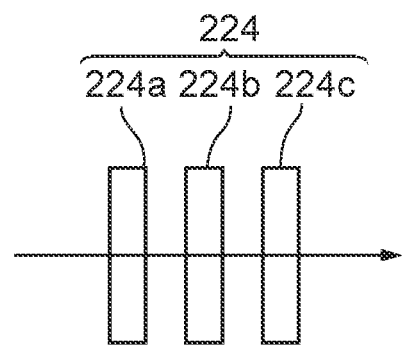
FIG. 14A is a side view of a fourth optical element.
Figure 14B:
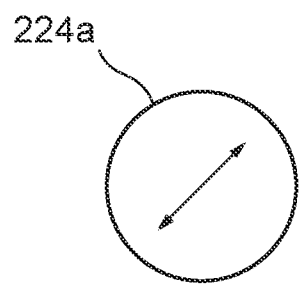
FIG. 14B is a front view of a polarizing filter.
Figure 14C:
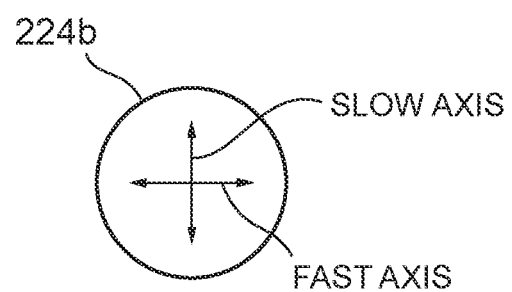
FIG. 14C is a front view of a ¼ wavelength plate.

As illustrated in FIG. 14A, the fourth optical element 224 is constituted by, in order along the light traveling direction, a polarizing filter 224a, a ¼ wavelength plate 224b and a band-pass filter 224c that passes only the circularly polarized light in the first wavelength band. The polarizing filter 224a of the fourth optical element 224 is adjusted so that the transmission axis in FIG. 14B turn in the 45° direction. The ¼ wavelength plate 224b of the fourth optical element 224 is adjusted so that the fast axis turns in the horizontal direction in FIG. 14C, and the slow axis turns in the vertical direction in FIG. 14C, in other words, the slow axis inclines 45° from the transmission axis of the polarizing filter 224a.

The fifth optical element 225 is constituted, in order along the light traveling direction, a polarizing filter, a ¼ wavelength plate and a band-pass filter that passes only the circularly polarized light in the second wavelength band. The fifth optical element 225 has a configuration similar to that of the fourth optical element 224, therefore detailed illustration thereof is omitted. The ¼ wavelength plate of the fifth optical element 225 is adjusted so that the slow axis is inclined 45° from the transmission axis of the polarizing filter.

The sixth optical element 226 is constituted by, in order along the light traveling direction, a polarizing filter of which direction of the transmission axis has been adjusted so as to pass only the third linearly polarized light, and a band-pass filter that passes only the third linearly polarized light in the second wavelength band. The seventh optical element 227 is constituted by, in order along the light traveling direction, a polarizing filter of which direction of the transmission axis has been adjusted so as to pass only the second linearly polarized light, and a band-pass filter that passes only the second linearly polarized light in the second wavelength band. The eighth optical element 228 is constituted by, in order along the light traveling direction, a polarizing filter of which direction of the transmission axis has been adjusted so as to pass only the first linearly polarized light, and a band-pass filter that passes only the first linearly polarized light in the second wavelength band. The sixth optical element 226, the seventh optical element 227 and the eighth optical element 228 have configurations that are similar to that of the first optical element 221, therefore detailed illustrations thereof are omitted.

The small lens array 30 is disposed on the image side of the optical element array 220. The positions are corresponded respectively as: the first small lens 31 to the first optical element 221; the second small lens 32 to the second optical element 222; the third small lens 33 to the third optical element 223; the fourth small lens 34 to the fourth optical element 224; the fifth small lens 35 to the center hole 272; the sixth small lens 36 to the fifth optical element 225; the seventh small lens 37 to the sixth optical element 226; the eighth small lens 38 to the seventh optical element 227; and the ninth small lens 39 to the eighth optical element 228. Each of the first small lens 31 to the ninth small lens 39 receive luminous flux that passed the first optical element 221 to the fourth optical element 224, the center hole 272 and the fifth optical element 225 to the eighth optical element 228 respectively, and independently forms an image at a finite distance OB1 or an image at infinity OB2.

Similarly to Embodiment 1, the picture element 50 is disposed on the image side of the small lens array 30. Further, similarly to Embodiment 1, the partition member 40 is disposed between the small lens array 30 and the picture element 50.

The image processor 260 determines a two-dimensional distribution of the Stokes parameters in the first wavelength band in an object image (unmodulated) based on the image signals of the object images Im1 to Im4, according to the optical characteristics of the first optical element 221 to the fourth optical element 224, output from the picture element 50. Moreover, the image processor 260 determines a two-dimensional distribution of the Stokes parameters in the second wavelength band in an object image (unmodulated), based on the image signals of the object images Im6 to Im9, according to the optical characteristics of the fifth optical element 225 to the eighth optical element 228, output from the picture element 50.

The Stokes parameters can be determined as a polarizing state of light by measuring the intensity of the first linearly polarized light that passed the first optical element 221 (eighth optical element 228), the intensity of the second linearly polarized light that passed the second optical element 222 (seventh optical element 227), the intensity of the third linearly polarized light that passed the third optical element 223 (sixth optical element 226), and the intensity of the circularly polarized light that passed the fourth optical element 224 (fifth optical element 225). The method for calculating the Stokes parameter is stated in "Optical Technology Handbook" (Asakura Publishing Co., Ltd. 1988), for example.

In the imaging device 1 according to Embodiment 1, an object at a finite distance OB1 or an object at infinity OB2 is focused by moving the first lens group 11 along the optical axis Ax using the lens drive device (not illustrated). Now the operation when the object at a finite distance OB1 is focused will be described. Operation in the case when the object at infinity OB2 is focused is the same as the case when the object at a finite distance OB1 is focused, therefore description thereof is omitted.

The luminous flux from the focused object at a finite distance OB1 transmits through the first lens group 11 and the second lens group 12, and becomes a parallel luminous flux when emitted from the second lens group 12. The parallel luminous flux emitted from the front optical system 10 passes one of the first optical element 221 to the fourth optical element 224, the center hole 272, and the fifth optical element 225 to the eighth optical element 228 in the optical element array 220, and reaches the small lens array 30. The first small lens 31 to the ninth small lens 39 of the small lens array 30 receive the luminous flux that passed the first optical element 221 to the fourth optical element 224, the center hole 272, and the fifth optical element 225 to the eighth optical element 228, respectively, and form an image of the object at a finite distance OB1 independently from one another.

The luminous flux from the focused object at a finite distance OB1 has been collimated into a parallel luminous flux when entering the spectral filter array 20 by the focusing operation of the first lens group 11 (focusing lens group), hence all of the nine object images formed by the small lenses 31 to 39 are positioned on the same plane (focal plane). Further, because of the function of the front optical system 10, the object at a finite distance OB1 looks as if the object OB1 exists at infinity when viewed from the small lens array 30. Therefore no parallax is generated among the nine images of the object at a finite distance OB1 formed by the first small lens 31 to the ninth small lens 39 respectively, similarly to Embodiment 1.

On the imaging plane 51, an object image Im1 based on the first linearly polarized light, an object image Im2 based on the second linearly polarized light, an object image Im3 based on the third linearly polarized light, and an object image Im4 based on the circularly polarized light are formed in accordance with the optical characteristics of the first optical element 221 to the fourth optical element 224 for the first wavelength band (see FIG. 7). Further, on the imaging plane 51, an object image Im5 based on the light which passed the center hole 272 is formed (see FIG. 7). Further still, on the imaging plane 51, an object image Im6 based on the circularly polarized light, an object image Im7 based on the third linearly polarized light, an object image Im8 based on the second linearly polarized light, and an object image Im9 based on the first linearly polarized light are formed in accordance with the optical characteristics of the fifth optical element 225 to the eighth optical element 228 for the second wavelength band (see FIG. 7).

The picture element 50 captures nine object images Im1 to Im9 formed on the imaging plane 51, and outputs to the image signals thereof to the image processor 260. The image processor 260 determines a two-dimensional distribution of the Stokes parameters in the first wavelength band in the object images (unmodulated) based on the image signals of the object images Im1 to Im4 in accordance with the optical characteristics of the first optical element 221 to the fourth optical element 224 output from the picture element 50. Furthermore, the image processor 260 determines a two-dimensional distribution of the Stokes parameter in the second wavelength band in the object images (unmodulated) based on the image signals of the object images Im6 to Im9 in accordance with the optical characteristics of the fifth optical element 225 to the eighth optical element 228 output from the picture element 50.

At this time, the picture element 50 captures each object image Im1 to Im9 in a state of shifting into three positions in the vertical, horizontal or diagonal direction respectively from the imaging pixel 52 (see FIG. 8). The image processor 260 performs predetermined image processing based on the image signal of each object image Im1 to Im9 obtained in a state of shifting into three positions in the vertical, horizontal or diagonal direction respectively from the imaging pixel 52, whereby resolution information on the spatial frequency, which is higher than the Nyquist frequency determined by the imaging size, can be obtained.

According to Embodiment 3, an effect similar to Embodiment 1 can be obtained. In Embodiment 3, the optical element array 220, which includes the first optical element 221 (eighth optical element 228) for generating the first linearly polarized light, the second optical element 222 (seventh optical element 227) for generating the second linearly polarized light, the third optical element 223 (sixth optical element 226) for generating the third linearly polarized light, and the fourth optical element 224 (fifth optical element 225) for generating the circularly polarized light, is detachably held by the holding member 271. Because of this, the two-dimensional distribution of the Stokes parameters of an object image in a single wavelength band or in multi-wavelength bands can be obtained by a single imaging process without applying load to the image processing. Furthermore, an optical element array 220 can be replaced with a unit having different specifications in the optical characteristics, such as a transmission wavelength of the band-pass filter.

In Embodiment 3, the front optical system 10 of Embodiment 1 may be replaced with the front optical system 110 of Embodiment 2. In this case, the partition member 40 may be disposed between the small lens array 30 and the picture element 50, or the partition member 40 may not be disposed. If the partition member 40 is disposed between the small lens array 30 and the picture element 50, the field stop 115 need not be disposed in the front optical system 110.

In Embodiment 3, if the image processor 260 can access the functions of Embodiment 3 and the functions of Embodiment 1 by switching, then the optical element array 220 of Embodiment 3 and the spectral filter array 20 of Embodiment 1 can be used by detachment/replacement.

Now Embodiment 4 of the imaging device will be described with reference to FIG. 15. The imaging device 301 of Embodiment 4 has, similarly to Embodiment 1, a front optical system 10, a spectral filter array 320, a small lens array 330, a partition member 345, a picture element 350 and an image processor 60. The front optical system 10 and the image processor 60 have configurations similar to those of Embodiment 1, therefore are denoted with the same reference numerals as Embodiment 1, for which detailed description and drawings are omitted. Similarly to Embodiment 1, the front optical system 10 is housed inside a lens barrel (not illustrated). The spectral filter array 320, the small lens array 330, the partition member 345, the picture element 350 and the image processor 60, on the other hand, are housed inside a camera body (not illustrated), similarly to Embodiment 1.

Figure 18:
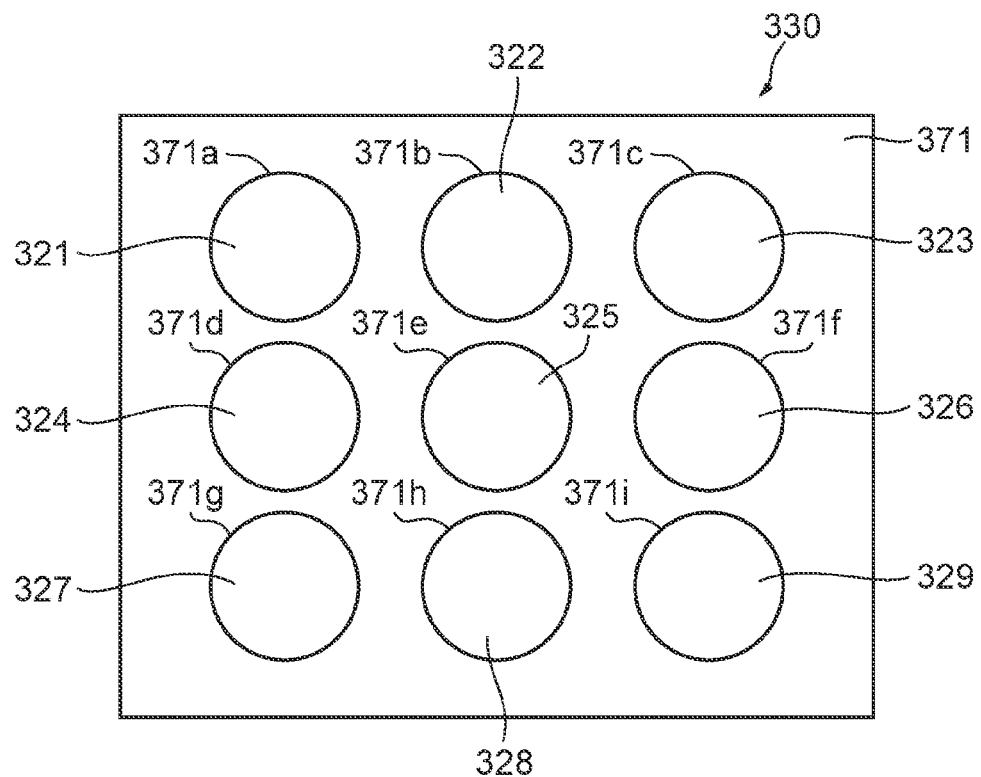
FIG. 18 is a front view of a spectral filter array.

Similarly to Embodiment 1, the spectral filter array 320 is disposed on the image side of the front optical system 10. As illustrated in FIG. 18, the spectral filter array 320 is constituted by nine spectral filters (a first spectral filter 321 to a ninth spectral filter 329), which are two-dimensionally arrayed along a plane perpendicular to the optical axis of the front optical system 10, and a holding member 371 that holds these spectral filters. In the holding member 371, nine frames 371a to 371i, for holding the nine spectral filters 321 to 329 respectively, are created, and also function as aperture stops respectively. The holding member 371 is detachably/replaceably attached to a holding mechanism (not illustrated) disposed inside a camera body (not illustrated), similarly to Embodiment 1. The first spectral filter 321 to the ninth spectral filter 329 have configurations similar to those of the first spectral filter 21 to the ninth spectral filter 29 of Embodiment 1, of which detailed description is omitted.

Figure 16:
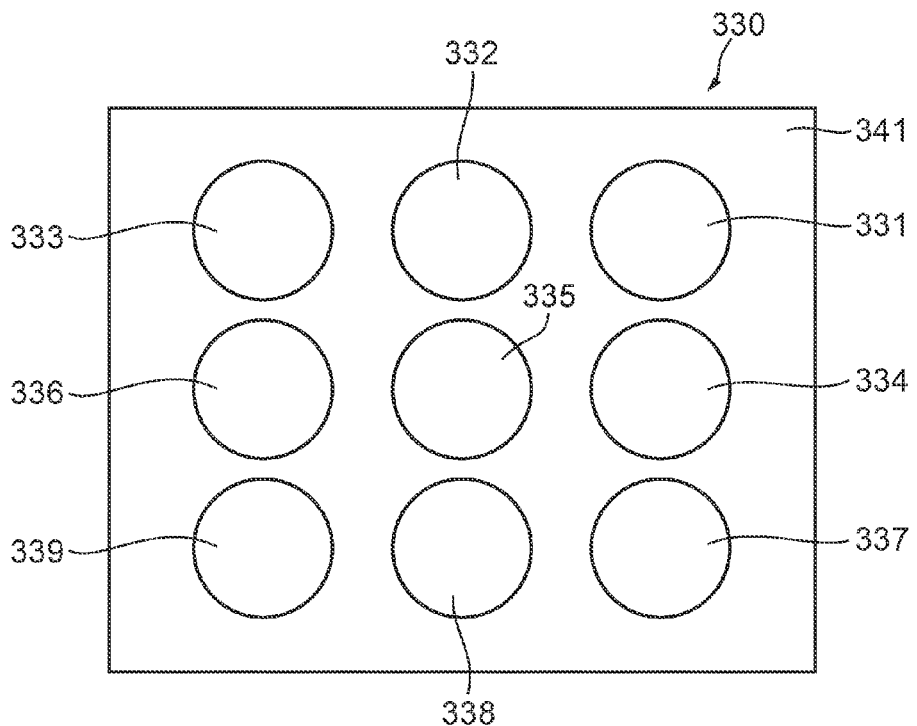
FIG. 16 is a front view of a small lens array.

The small lens array 330 is disposed on the image side of the spectral filter array 320. As illustrated in FIG. 15 and FIG. 16, the small lens array 330 is constituted by a transparent plane parallel plate 341 and nine small lenses (first small lens 331 to ninth small lens 339). The plane parallel plate 341 is a plate that extends along the plane perpendicular to the optical axis of the front optical system 10. The nine small lenses 331 to 339, which all have positive refractive power and the same specifications, and are smaller than the picture element 350, are cemented to the image side surface of the plane parallel plate 341.

The first small lens 331 to the ninth small lens 339 have sizes similar to those of the first spectral filter 321 to the ninth spectral filter 329, and are two-dimensionally arrayed along a plane perpendicular to the optical axis of the front optical system 10, similarly to Embodiment 1. In other words, the nine small lenses 331 to 339 are arrayed three vertical rows by three horizontal columns.

The positions are corresponded respectively as: the first small lens 331 to the first spectral filter 321; the second small lens 332 to the second spectral filter 322; the third small lens 333 to the third spectral filter 323; the fourth small lens 334 to the fourth spectral filter 324; the fifth small lens 335 to the fifth spectral filter 325; the sixth small lens 336 to the sixth spectral filter 326; the seventh small lens 337 to the seventh spectral filter 327; the eighth small lens 338 to the eighth spectral filter 328; and the ninth small lens 339 to the ninth spectral filter 329. The first small lens 331 to the ninth small lens 339 receive the luminous flux that passed the first spectral filter 321 to the ninth spectral filter 329 (and the plane parallel plate 341) respectively, and independently form an image of an object at a finite distance or an image of an object at infinity (not illustrated).

Figure 17:
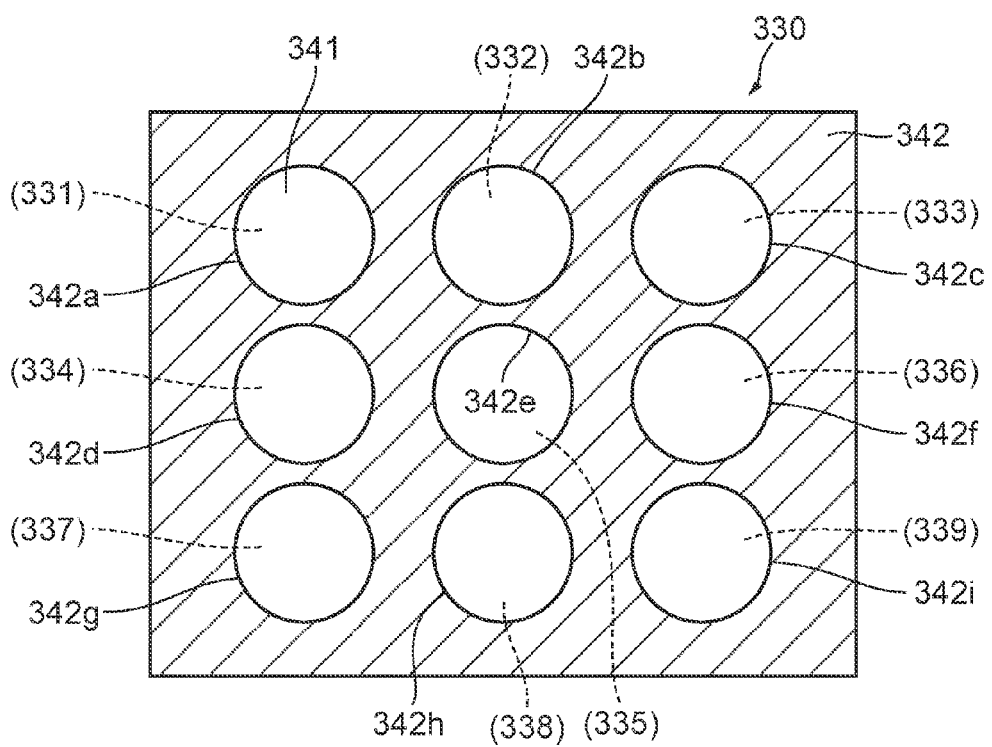
FIG. 17 is a front view of a light shielding plate.

A light shielding plate 342 is disposed on the object side surface of the plane parallel plate 341 so as to closely contact with the surface. As illustrated in FIG. 17, the light shielding plate 342 is a plate having nine openings 342a to 342i that pass light only in the light receiving ranges of the nine small lenses 331 to 339, and is configured to shield light in an area other than the light receiving ranges of the nine small lenses 331 to 339.

The picture element 350 is disposed on the image side of the small lens array 330. The partition member 345 is disposed between the small lens array 330 and the picture element 350. As illustrated in FIG. 15, the picture element 350 has an imaging plane 351 which is similar to that of Embodiment 1, and forms nine object images (images of an object at a finite distance or object at infinity (not illustrated)) on the imaging plane 351 using the first small lens 331 to the ninth small lens 339. Then the picture element 350 captures the nine object images formed on the imaging plane 351, and outputs the image signals thereof to the image processor 60. A cover glass 352 is disposed near the imaging plane 351 of the picture element 350. The imaging plane 351 is constituted by a plurality of imaging pixels, and the positional relationship between each center axis of the first small lens 331 to the ninth small lens 339 and the imaging pixel is set in the same manner as Embodiment 1.

Figure 19:
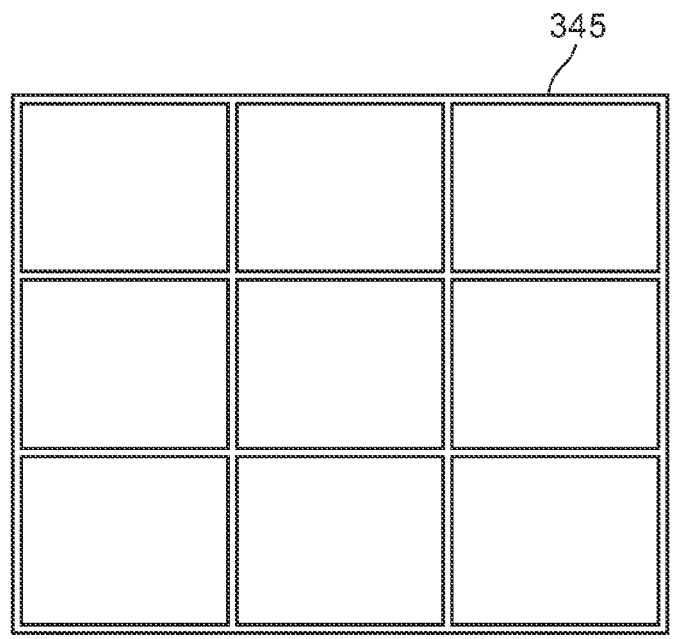
FIG. 19 is a front view of a partition member.

As illustrated in FIG. 19, the partition member 345 is formed in a lattice shape having nine rectangular openings, so that each opening corresponds to each of the first small lens 331 to the ninth small lens 339 respectively one-to-one. Because of this, overlapping among the nine image forming luminous fluxes transmitted through the first small lens 331 to the ninth small lens 339 is solved, and the nine object images generated by the first small lens 331 to the ninth small lens 339 are formed separately on the imaging plane 351. The surface of the partition member 345 is treated to prevent reflection of the light (e.g. blackened). The plate material constituting the partition member 345 is disposed on the border lines of the nine object images on the imaging plane 351.

In the imaging device 301 of embodiment 4, an object at a finite distance or an object at infinity (not illustrated) can be focused on in the same manner as Embodiment 1. The luminous flux from the focused object at a finite distance or object at infinity (not illustrated) passes the front optical system 10, and is collimated into a parallel luminous flux, similarly to Embodiment 1. The parallel luminous flux emitted from the front optical system 10 passes one of the first spectral filter 321 to the ninth spectral filter 329 of the spectral filter array 320, and reaches the small lens array 330. The first small lens 331 to the ninth small lens 339 of the small lens array 330 receive the luminous flux that passed the first spectral filter 321 to the ninth spectral filter 329 (and the plane parallel plate 341) respectively, and form an image (object image) of the object at a finite distance or object at infinity (not illustrated) independently from one another.

The nine object images formed on the imaging plane 351 are generated with spectral characteristics corresponding to the first spectral filter 321 to the ninth spectral filter 329 respectively. The picture element 350 captures the nine object images formed on the imaging plane 351, and outputs the image signals thereof to the image processor 60. Based on the image signals of the object images according to the spectral characteristics of each spectral filter 321 to 329 output from the picture element 350, the image processor 60 generates a multi-wavelength band image of the object at a finite distance or object at infinity (not illustrated), in the same manner as Embodiment 1.

Figure 20:
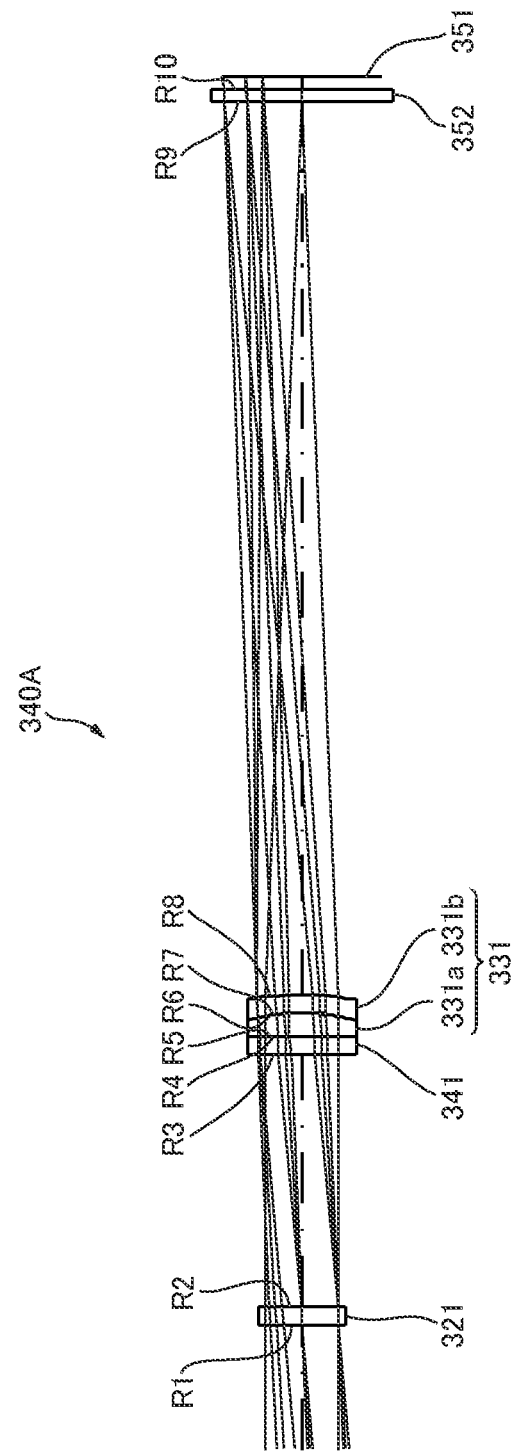
FIG. 20 is a diagram depicting a lens configuration of an imaging optical system that includes the small lenses of Embodiment 4.

Now the nine small lenses 331 to 339 of the small lens array 330 will be described in more detail. Since the nine small lenses 331 to 339 have the same specifications, only the first small lens 331 is described, and description on the second small lens 332 to the ninth small lens 339 is omitted. As illustrated in FIG. 20, the first small lens 331 is constituted by a cemented lens having positive refractive power as a whole, in which a positive lens 331a having a plan-convex shape and a negative lens 331b having a meniscus shape of which concave surface faces the object, are cemented in order from the object. The above mentioned plane parallel plate 341 is cemented to the object side surface of the positive lens 331a which is formed as a plane. In other words, the plane parallel plate 341 is cemented to the object side surface of each cemented lens of the first small lens 331 to the ninth small lens 339. In this cemented lens, the negative lens 331b is formed using a lens material of which refractive index is higher and the Abbe number is smaller than that of the positive lens 331a.

FIG. 20 is an optical path diagram of an optical system that includes the first small lens 331 of Embodiment 4 (this optical system is hereafter called "imaging optical system 340A"), and it is assumed that the imaging optical system 340A is used in the 380 nm to 1000 nm wavelength range (this is the same for the second small lens 332 to the ninth small lens 339 as well). As mentioned above, in the imaging optical system 340A, the first spectral filter 321 of the spectral filter array 320 is disposed on the object side of the first small lens 331 (and the plane parallel plate 341), and the imaging plane 351 of the picture element 350 and the cover glass 352 are disposed on the image side of the first small lens 331 (via the partition member 345). The aperture stop is disposed on the object side surface of the first spectral filter 321 (frame 371a of the spectral filter array 320).

Table 1 shows the lens data of the imaging optical system 340A of Embodiment 4. In the lens data in Table 1, the surface number indicates a sequential number of each lens surface counted from the object side, R denotes the radius of curvature of each lens surface, D denotes a distance from each lens surface to the next lens surface, E denotes an effective diameter of each lens surface, nd denotes a refractive index at the d-line (wavelength λ: 587.6 nm), and νd denotes an Abbe number at the d-line (wavelength λ: 587.6 nm). The radius of curvature R=∞ indicates a plane, and the refractive index of air nd=1.0000 is omitted. The units of the radius of curvature R, the surface distance D and the effective diameter E are "mm". Each radius of curvature R of surface 1 to surface 10 in Table 1 corresponds to each symbol R1 to R10 assigned to surface 1 to surface 10 as shown in FIG. 20.

TABLE 1

| Surface number | R | D | E | nd | νd |
|---|---|---|---|---|---|
| 1 | ∞ | 1.00 | 4.0 | 1.5168 | 63.9 (spectral filter) |
| 2 | ∞ | 14.00 | 4.0 | | |
| 3 | ∞ | 1.00 | 4.0 | 1.5168 | 63.9 |
| 4 | ∞ | 0.01 | 4.0 | 1.6 | (Adhesive layer) |
| 5 | ∞ | 1.30 | 4.0 | 1.5168 | 63.9 |
| 6 | −11.0130 | 0.01 | 4.0 | 1.6 | (Adhesive layer) |
| 7 | −11.0130 | 1.00 | 4.0 | 1.834 | 37.2 |
| 8 | −17.3464 | 49.61 | 4.0 | | |
| 9 | ∞ | 0.70 | | 1.5168 | 63.9 (Cover glass) |
| 10 | ∞ | 0.70 | | | |

Table 2 shows the image distance change amount when a subtle change is applied to a parameter that causes dispersion of the image distance in the lens data in Table 1. In the change amount data in Table 2, the surface number indicates a sequential number of each lens surface counted from the object side, ΔR denotes a change amount of the radius of curvature R, ΔD denotes a change amount of the surface distance D, Δnd denotes a change amount of a refractive index nd, and ΔI denotes the image distance change amount.

The image distance and the cause of dispersion of the image distance will be described later. The units of the change amount ΔR of the radius of curvature R, the change amount ΔD of the surface distance D, and the image distance change amount ΔI are "mm".

TABLE 2

| [Image distance change amount with respect to subtle change of radius of curvature] | | |
|---|---|---|
| Surface number | ΔR | ΔI |
| 3 | +7325.0 | −0.175 |
| 4 | +7325.0 | −0.018 |
| 5 | −7325.0 | −0.018 |
| 6 | +0.016171 | +0.028 |
| 7 | +0.016171 | +0.078 |
| 8 | −0.040765 | +0.291 |

| [Image distance change amount with respect to subtle change of surface distance] | | |
|---|---|---|
| Surface number | ΔD | ΔI |
| 6 | +0.01 | +0.001 |
| 7 | +0.01 | −0.011 |

| [Image distance change amount with respect to subtle change of refractive index] | | |
|---|---|---|
| Surface number | Δnd | ΔT |
| 5 | +0.001 | −0.225 |
| 6 | +0.001 | −0.000 |
| 7 | +0.001 | +0.079 |

Figure 21:
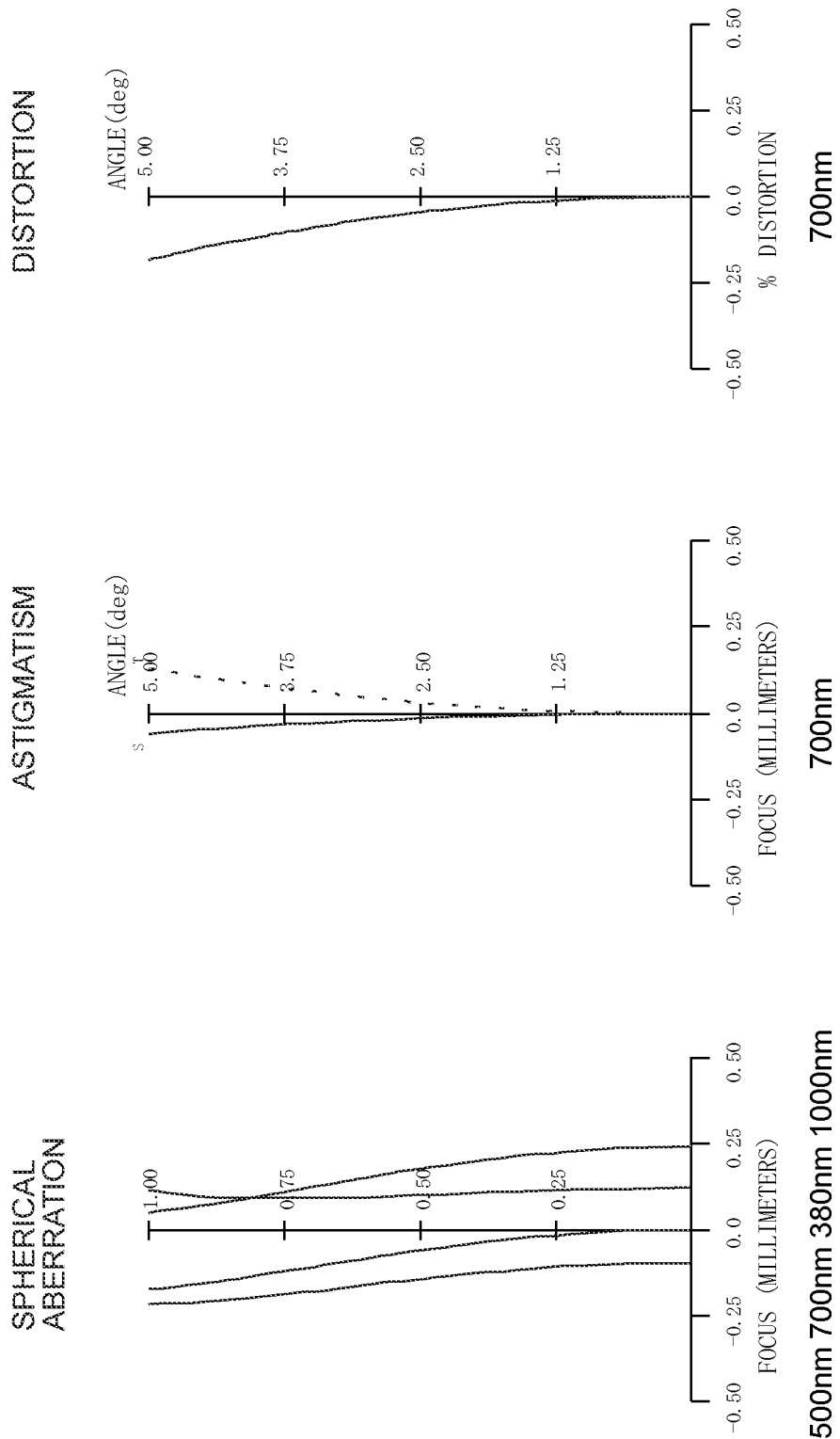
FIG. 21 are graphs showing various aberrations of the imaging optical system of Embodiment 4.

FIG. 21 are graphs showing various aberrations of the imaging optical system 340A of Embodiment 4. In the graph showing spherical aberration in FIG. 21, the longitudinal aberration curves, when the wavelength is 500 nm, 700 nm, 380 nm and 1000 nm, are shown in order from the left. In the graphs showing astigmatism and distortion in FIG. 21, longitudinal aberration curves, when the wavelength is 700 nm, are shown.

Figure 22:
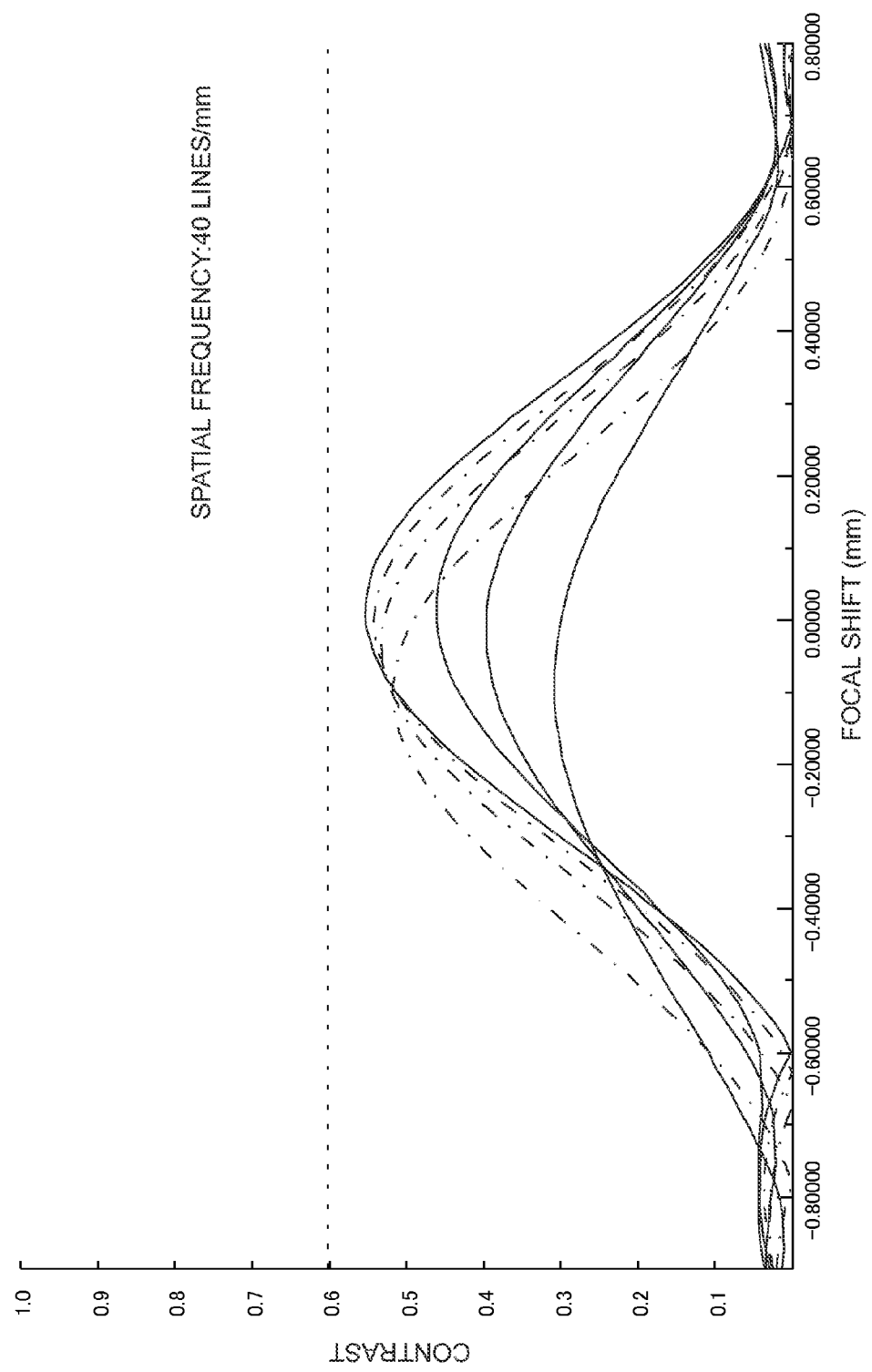
FIG. 22 is a graph depicting a relationship between MTF and focal shift in the imaging optical system of Embodiment 4.

FIG. 22 shows a relationship between the MTF (Modulation Transfer Function) when the spatial frequency on the image plane is 40 lines/mm, and the focal shift in the imaging optical system 340A of Embodiment 4. The abscissa of the graph in FIG. 22 indicates the focal shift in the optical axis direction, and the plus (+) direction of the abscissa indicates the direction moving away from the first small lens 331. The ordinate of the graph in FIG. 22 indicates the contrast of the white MTF. The graph of FIG. 22 shows the MTF curves when the wavelengths are 380 nm, 500 nm, 700 nm and 1000 nm.

As shown in FIG. 21, in the imaging optical system 340A of Embodiment 4, astigmatism and curvature of field aberration are suppressed, even if the first small lens 331 is constituted by a cemented lens of two lenses (doublet) (this is the same for the second small lens 332 to the ninth small lens 339). This is largely because of the positional setting on the optical axis of the frame 371a (first spectral filter 321) of the spectral filter array 320 that functions as an aperture stop. If the aperture stop (first spectral filter 321) is set too close to the plane parallel plate 341 in order to save installation space, then astigmatism in particular worsens, and MTF in the sagittal direction in the four corner areas of the imaging range rapidly deteriorates.

As a conventional imaging device, a multi-band camera that allows a plurality of imaging optical systems, constituting a multiple lens optical system, to receive light in mutually different wavelength bands respectively, and obtains a plurality of object images having different wavelength bands by one shot, is known and disclosed in Japanese Laid-Open Patent Publication No. 2004-344583 (A) (hereafter called "Prior Art Document"), for example. In the technique according to this prior art document, an optimum focal setting is executed for each imaging optical system when a lens system, of which chromatic aberration is not corrected, is used for the imaging optical system, to simplify the imaging optical system.

In this technique however, the band-pass filter set combined with a group of imaging optical systems is fixed, unless the individual imaging optical system has an independent focal adjustment mechanism. Therefore it is difficult to change the spectral characteristics by replacing the band-pass filter set, which means that this technique lacks flexibility. Moreover, if the imaging optical systems are arrayed close together and cannot sufficient intervals cannot be secured, it is very difficult to provide an independent focal adjustment mechanism for the individual imaging optical system. Even if an individual imaging optical system has an independent focal adjustment mechanism, it is very complicated to re-execute focal adjustment for each imaging optical system when the band-pass filter set is replaced. Furthermore, there is another restriction in that an optical filter set that has spectral characteristics to pass light having a wider wavelength band, cannot be used to replace the band-pass filter set.

On the other hand, if an imaging optical system is used, of which chromatic aberration has been corrected, then the focal point (focused position) can be set on a same plane (on the imaging plane), regardless the wavelength, out of a predetermined wavelength band. Therefore if a multiple lens optical system is used as the multi-band camera, the optical filter can be replaced without re-executing focal adjustment of the individual imaging optical system, and imaging with various spectral characteristics is simplified. If it is assumed that the imaging optical systems are arrayed into a plurality of rows within a limited space, then it is practical to configure the imaging optical system by a dioptric system with regard to the limited space. To correct chromatic aberration of the dioptric system, the imaging lens must be constituted by a combination of at least two different types of lens materials. However in the case of arraying a plurality of imaging optical systems having a dioptric system of which chromatic aberration has been corrected, aligning the respective focal planes without including an independent focal adjustment mechanism, it is critical to control the tolerance of the distance from the final lens surface of the individual imaging optical system to the image plane, that is, the tolerance of the image distance. The image distance disperses due to the following reasons.
(1) Dispersion of the radius of curvature of the lens
(2) dispersion of the center thickness of the lens
(3) dispersion of the lens interval when the imaging optical system is constituted by a plurality of lens groups, and
(4) dispersion of the refractive index of the lens material.

In addition to controlling the tolerance of the image distance, the method of holding the plurality of imaging optical system within a limited space is problematical. In the case of the ordinary method of housing the lenses inside a lens barrel, a limited space must be allocated considering the thickness of the lens barrel, and lens diameters must be restricted accordingly. As a result, the light receiving amount is restricted as well.

Figure 34:
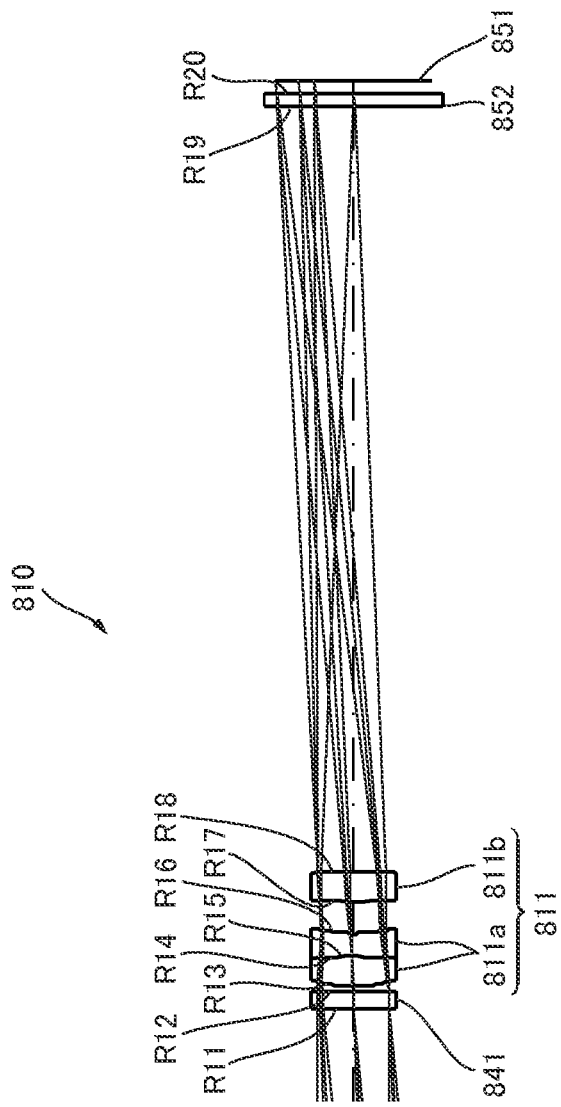
FIG. 34 is a diagram depicting a lens configuration of an imaging optical system that includes small lenses of a reference example.

In ordinary optical design, an optical system is often constituted by a plurality of lens groups. For example, a dioptric system 811 constituted by three lenses in two lens group could be designed, as shown in FIG. 34 (reference example). This dioptric system 811 has a first lens group 811a constituted by a cemented lens in which a positive lens and a negative lens are cemented, and a second lens group 811b constituted by a positive lens. FIG. 34 is an optical path diagram of an imaging optical system 810 that includes the dioptric system 811 constituted by three lenses in two lens groups. In this imaging optical system 810, a spectral filter 841, similar to that of Embodiment 4, is disposed on the object side of the dioptric system 811, and an imaging plane 851 of a picture element (not illustrated) and the cover glass 852, similar to those of Embodiment 4 are disposed on the image side of the dioptric system 811. Further, an aperture stop is disposed on the object side surface of a spectral filter 841 (frame of spectral filter array).

Table 3 shows the lens data of the imaging optical system 810 of the reference example. In the lens data in Table 3, description on the surface member, radius of curvature R, surface distance D, effective diameter E, refractive index nd, Abbe number vd and the like is the same as the lens data in Table 1. Each radius of curvature R of surface 1 to surface 10 in Table 3 corresponds to each symbol R11 to R20 assigned to surface 1 to surface 10 in FIG. 28.

TABLE 3

| Surface number | R | D | E | nd | vd |
|---|---|---|---|---|---|
| 1 | ∞ | 1.00 | 4.0 | 1.5168 | 63.9 (Spectral filter) |
| 2 | ∞ | 0.30 | 4.0 | | |
| 3 | 8.2919 | 1.70 | 4.0 | 1.58913 | 61.2 |
| 4 | −23.3125 | 0.01 | 4.0 | 1.6 | (Adhesive layer) |
| 5 | −23.3125 | 1.30 | 4.0 | 1.7432 | 49.3 |
| 6 | 8.7081 | 1.80 | 4.0 | | |
| 7 | 35.2239 | 1.70 | 4.0 | 1.58913 | 61.2 |
| 8 | −35.2239 | 43.22 | 4.0 | | |
| 9 | ∞ | 0.70 | | 1.5168 | 63.9 (Cover glass) |
| 10 | ∞ | 0.70 | | | |

Table 4 shows the image distance change amount when a subtle change is applied to a parameter that causes dispersion of the image distance in the lens data in Table 3. In the change amount data in Table 4, description on the change amount ΔR of radius of curvature R, the change amount ΔD of the surface distance D, and the image distance change amount ΔI are the same as in the change amount data in Table 2.

TABLE 4

| [Image distance change amount with respect to subtle change of radius of curvature] | | |
|---|---|---|
| Surface number | ΔR | ΔI |
| 3 | +0.008985 | +0.193 |
| 4 | +0.074020 | +0.003 |
| 5 | +0.074020 | +0.042 |
| 6 | −0.009953 | +0.187 |
| 7 | +0.169789 | +0.160 |
| 8 | −0.169789 | +0.158 |
| [Image distance change amount with respect to subtle change of surface distance] | | |
| Surface number | ΔD | ΔI |
| 3 | +0.01 | −0.079 |
| 4 | +0.01 | −0.078 |
| 5 | +0.01 | −0.060 |

TABLE 4-continued

| | | |
|---|---|---|
| 6 | +0.01 | −0.002 |
| 7 | +0.01 | −0.000 |

[Image distance change amount with respect
to subtle change of refractive index]

| Surface number | Δnd | ΔI |
|---|---|---|
| 3 | +0.001 | −0.381 |
| 4 | +0.001 | +0.000 |
| 5 | +0.001 | +0.317 |
| 7 | +0.001 | −0.112 |

Figure 35:
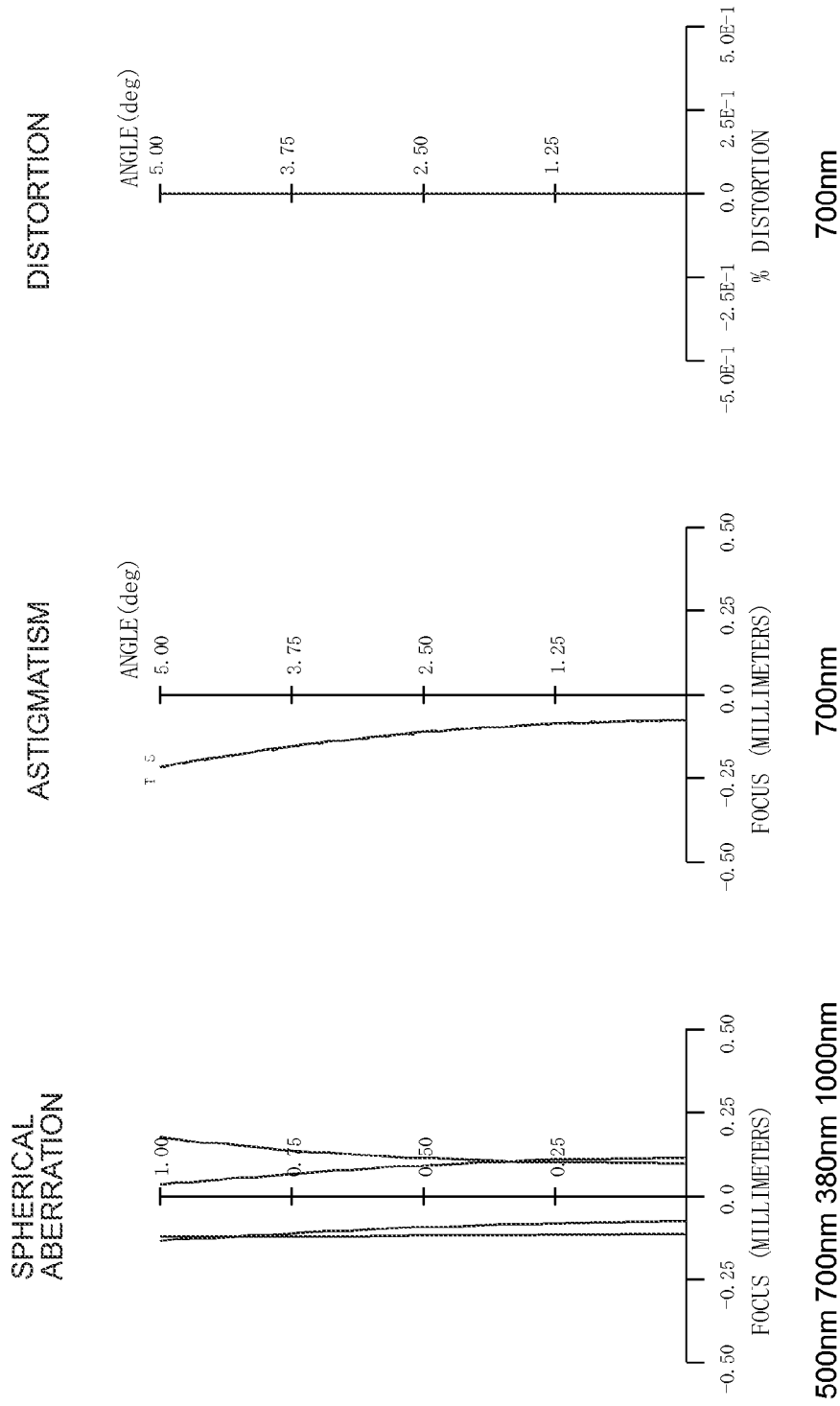
FIG. 35 are graphs showing various aberrations of an imaging optical system of the reference example.
Figure 36:
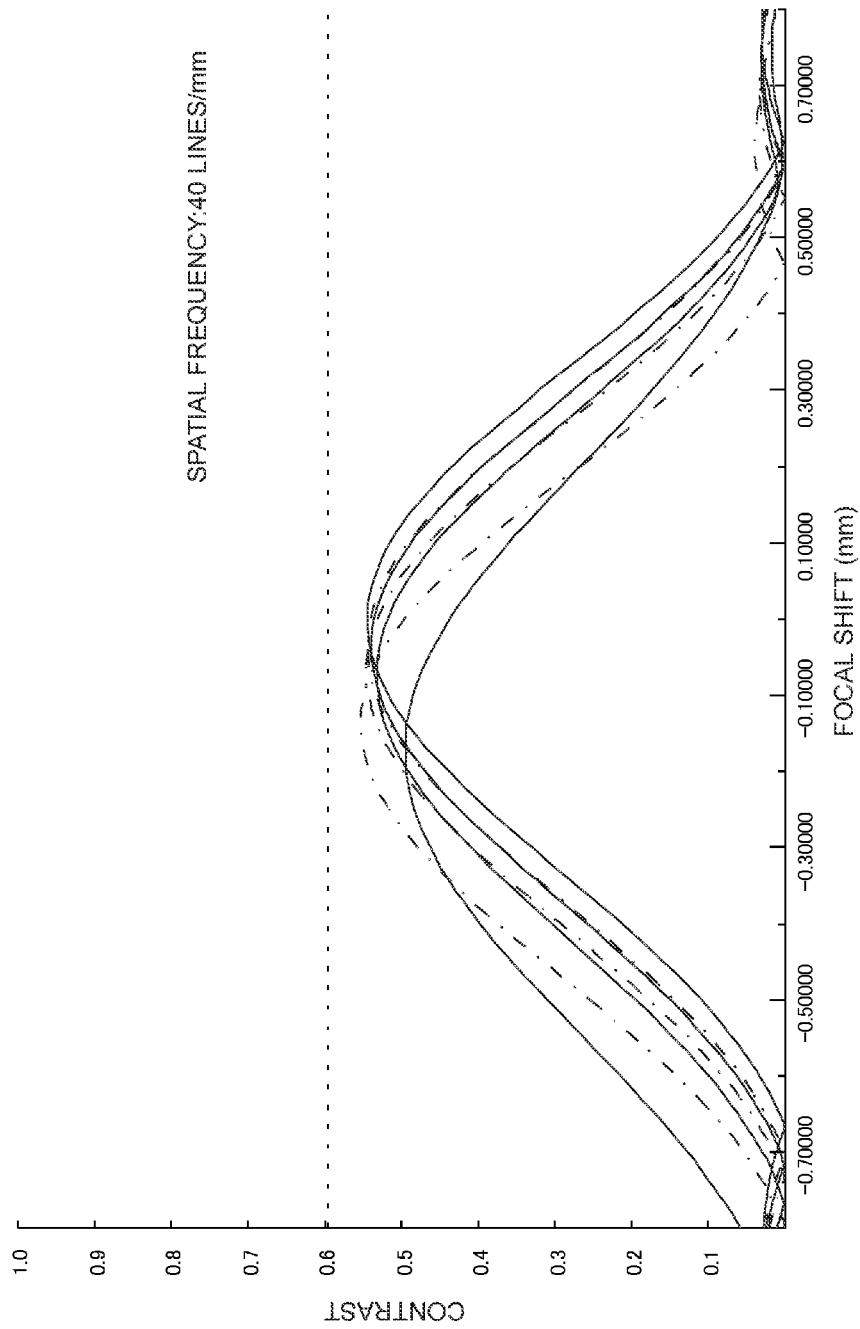
FIG. 36 is a graph depicting a relationship between MTF and focal shift in the imaging optical system of the reference example.

FIG. 35 are graphs showing various aberrations of the imaging optical system 810 of the reference example. The wavelengths used for the graphs showing various aberrations in FIG. 35 are the same as those in FIG. 21. FIG. 36 shows the relationship between the MTF when the spatial frequency on the image plane is 40 lines/mm and the focal shift in the imaging optical system 810 of the reference example. The description on the abscissa, ordinate and the like of the graph in FIG. 36 is the same as in FIG. 22.

As shown in FIG. 35 and FIG. 36, the dioptric system 811 constituted by three lenses in two lens groups has sufficient optical performance, but includes many factors that cause dispersion of image distance, as mentioned above. Table 4 shows that, if the radius of curvature R of any optical surface facing air is shifted by only one line of Newtons rings, the image distance changes 0.2 mm at the most. The error in the surface distance D also considerably influences a change in image distance. According to the image distance change amount ΔI in Table 4 and the MTF in FIG. 36, it is difficult to maintain the dispersion of the image distance within a range of securing an MTF that is sufficient for optical performance, even if the dimensional tolerance of the lens (dimensional tolerance of radius of curvature and center thickness), which causes dispersion of the image distance, is made more stringent.

Furthermore, in the case of the dioptric system 811 constituted by two lens groups, each lens group is housed in the lens barrel in order to hold the first lens group 811a and the second lens group 811b with minimal decentering. However wider intervals for the lens array (a plurality of dioptric systems 811) in the small lens array must be taken considering the amount of lens barrel thickness. This makes it difficult to receive a maximum quantity of light even by making the lenses in the lens array as dense as possible, and increasing the lens aperture.

The change of image distance will now be considered using the lens data in Table 1. The influence of the above mentioned causes of dispersion in image distances in the imaging optical system 340A of Embodiment 4 will be clarified by using numeric calculation. Among the causes of dispersion in the image distance, the dispersion of the lens intervals when the imaging optical system is constituted by a plurality of lens groups is not considered here, since in this embodiment the imaging optical system is constituted by one lens group.

In Table 2, the influence of each cause of dispersion on the change of the image distance when the wavelength is 587.562 nm is summarized. In Table 2, the dispersion of the radius of curvature of the lens (image distance change amount with respect to a subtle change in the radius of curvature) shows the case when a change equivalent to one line of Newtons rings (wavelength: 587.562 nm) occurred. According to Table 2, it is known that the object side surface of the plane parallel plate 341 (surface 3) and the image side surface of the negative lens 331b (surface 8) have a major influence on image distance. However, the object side surface of the plane parallel plate 341 is not a problem for manufacturing, since it is easy to finish this surface to a plane that has a precision high enough to exert no effect on the dispersion of image distance on the entire plane. It is not easy to finish the image side surface of the negative lens 331b to have an accurate radius of curvature, since the effective diameter is small, but this problem can be handled by manufacturing many negative lenses 331b and selecting nine lenses that have the same image distance, for example.

Next the dispersion of the center thickness of the lens (image distance change amount with respect to the subtle change of surface distance) will be considered. The thickness of the plane parallel plate 341 is not related to the dispersion of the image distance. An error in the center thickness of the positive lens 331a, as an independent lens, does not cause a change in the image distance, but if this lens is used in an array, the error (dispersion) in the center thickness of the positive lens 331a directly becomes the dispersion amount of the image distance. However the influence of the center thickness of the positive lens 331a on changes of the image distance can be reduced by managing the center thickness to be within an appropriate thickness tolerance with reference to the relationship between the MTF and the focal shift shown in FIG. 22, and by manufacturing many positive lenses 331a and creating a set of selected nine lenses, of which center thickness is correct. Unlike the center thickness of the positive lens 331a, an error in the center thickness of the negative lens 331b is generated in a direction where the change in the image distance cancels out the deviation of the center thickness, as shown in Table 2. In this case as well, the influence on a change in the image distance can be reduced by managing the center thickness to be within an appropriate thickness tolerance with reference to the relationship between the MTF and the focal shift shown in FIG. 22.

Finally the dispersion of the refractive index of the lens material (image distance change amount with respect to a subtle change in the refractive index) will be considered. An error in the refractive index considerably influences an image distance in both the positive lens 331a and the negative lens 331b. However the dispersion of the refractive index can be suppressed by using a glass that was manufactured in the same melting lot for all nine sets of lens elements (positive lenses 331a and negative lenses 331b of nine small lenses 331 to 339) to be arrayed, for example.

According to Embodiment 4, an effect similar to Embodiment 1 can be obtained. In Embodiment 4, each of the nine small lenses 331 to 339 is constituted by a cemented lens having positive refractive power as a whole, in which the positive lens 331a and the negative lens 331b are cemented, and the plane parallel plate 341 is cemented to the object side surface of this cemented lens. Thereby a change in the image distance based on a manufacturing error is decreased, hence the focal points (focusing positions) of the nine imaging optical systems (small lenses 331 to 339) can be easily aligned at high accuracy, even in a multi-lens optical system. Moreover, a lens barrel is not required to house the nine small lenses 331 to 339, hence the aperture diameter can be increased while decreasing the intervals of the nine small lenses 331 to 339, so as to secure a maximum quantity of imaging light.

Nine aperture stops are disposed on the surfaces on which nine spectral filters 321 to 329 are disposed, but various aberrations, such as astigmatism, can be satisfactorily corrected by appropriately setting the distances between the nine small lenses 331 to 339 and the aperture stops.

In the cemented lens constituting each small lens 331 to 339, chromatic aberration has been corrected to a predetermined wavelength range (e.g. 380 nm to 1000 nm). Therefore the spectral filter can be replaced with one that has any spectral characteristics that are within this predetermined wavelength range. In the cemented lenses constituting the nine small lenses 331 to 339, various aberrations, other than chromatic aberration, have also been sufficiently corrected for practical usage, hence high resolution performance can be obtained.

Figure 23:
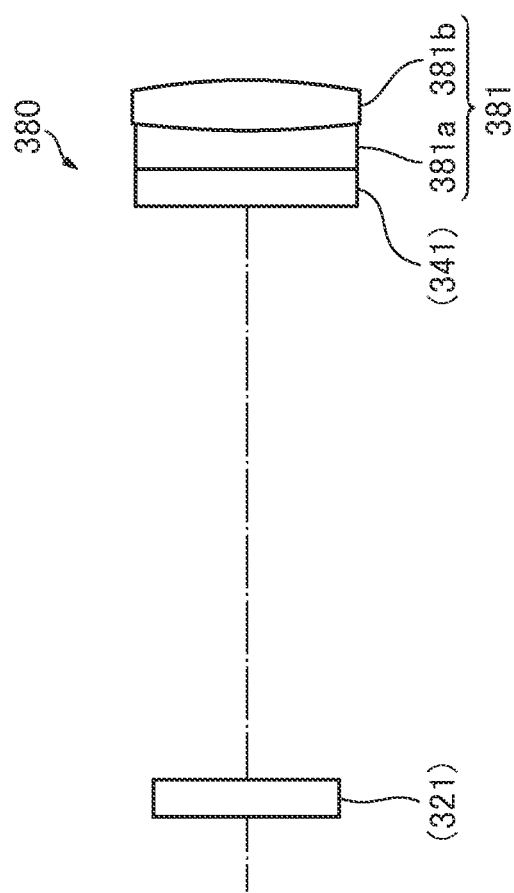
FIG. 23 is a diagram depicting a lens configuration of an imaging optical system that includes small lenses of a first modification.

In Embodiment 4, the first small lens 331 is constituted by a cemented lens having positive refractive power as a whole, in which the positive lens 331a and the negative lens 331b are cemented in order from the object, but the present invention is not limited to this (this is the same for the second small lens 332 to the ninth small lens 339 as well). For example, a first possible modification is an imaging optical system 380 that includes a small lens 381, as illustrated in FIG. 23. This small lens 381 is constituted by a cemented lens having positive refractive power as a whole, in which a negative lens 381a having a plan-concave shape and a positive lens 381b having a biconvex shape are cemented in order from the object. And a plane parallel plate 341 is cemented to the object side surface, formed as a plane, of the negative lens 381a. In other words, the sequence of the positive lens and the negative lens constituting the cemented lens may be reversed. In the imaging optical system 380 of the first modification, the first spectral filter 321 of the spectral filter array 320 is disposed on the object side of the small lens 381 (and the plane parallel plate 341), and the imaging plane 351 of the picture element 350 and the cover glass 352 (not illustrated in FIG. 23) are disposed on the image side of the small lens 381. In the cemented lens, the negative lens 381a is constituted by a lens material of which refractive index is higher and Abbe number is lower than those of the positive lens 381b.

Figure 24:
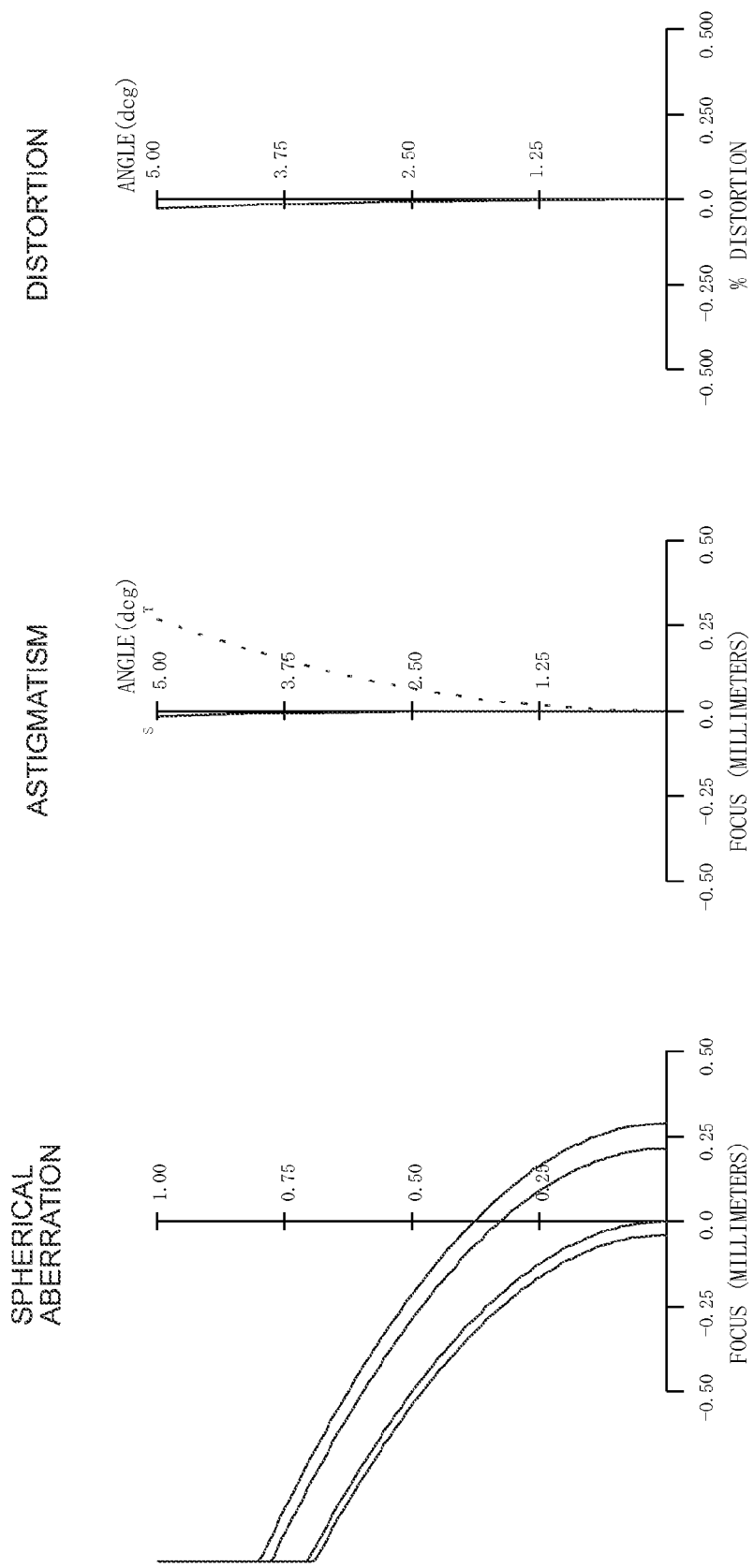
FIG. 24 are graphs showing various aberrations of the imaging optical system of the first modification.
Figure 25:
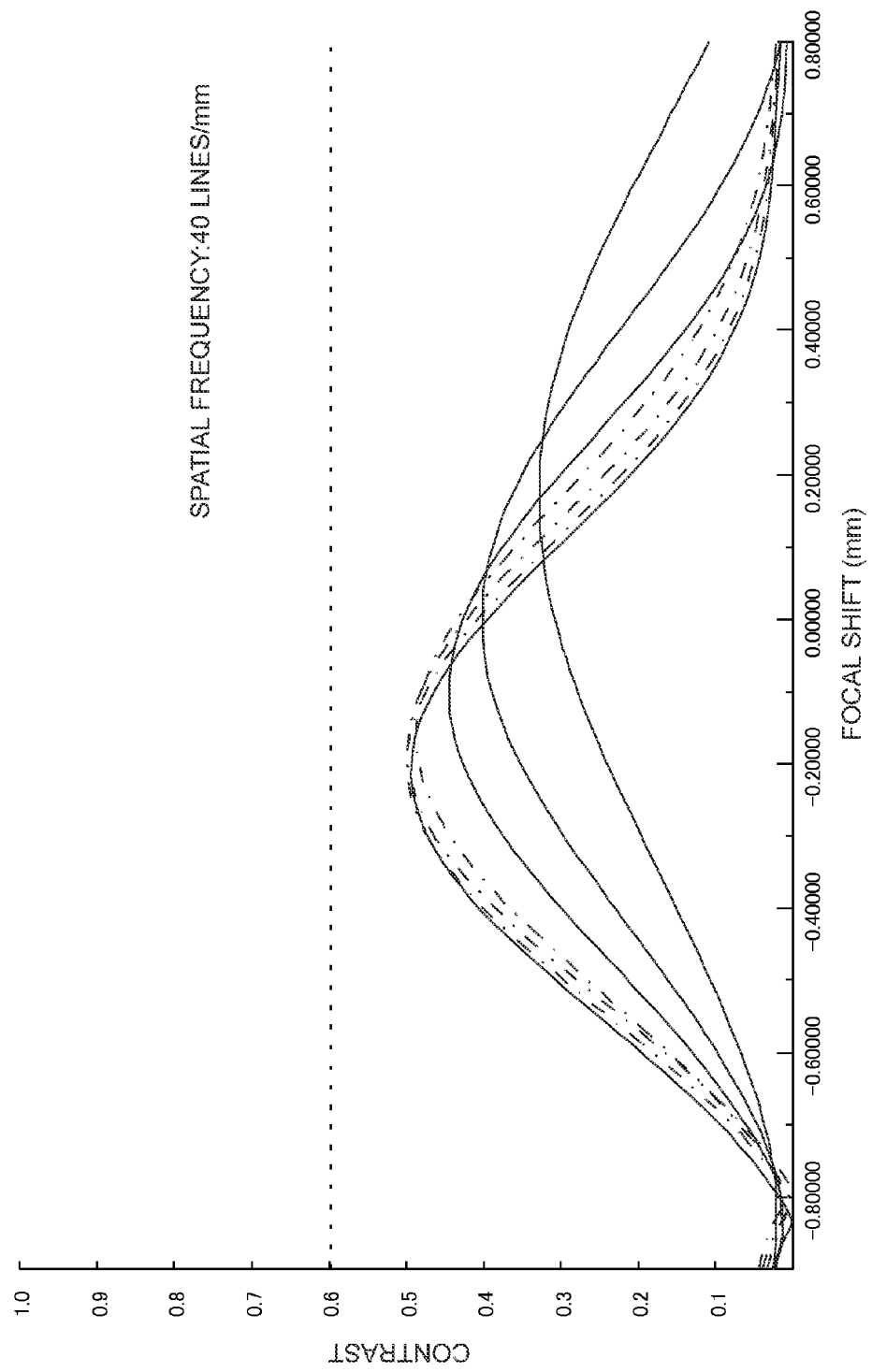
FIG. 25 is a graph depicting a relationship between MTF and focal shift in the imaging optical system of the first modification.

FIG. 24 are graphs showing various aberrations of the imaging optical system 380 of the first modification. The wavelengths used for the graph showing various aberrations in FIG. 24 are the same as those in FIG. 21. FIG. 24 shows that the imaging optical system 380 of the first modification is not as good as the imaging optical system 340A of Embodiment 4 in terms of correcting spherical aberration. However resolution is not affected much because the F number is large. FIG. 25 shows the relationship between the MTF, when the spatial frequency on the image plane is 40 lines/mm, and the focal shift in the imaging optical system 380 of the first modification. Description on the abscissa, ordinate and the like of the graph in FIG. 25 is the same as in FIG. 22. As FIG. 25 shows, the imaging optical system 380 of the first modification still exhibits practical performance even though the resolution performance is not as good as the imaging optical system 340A of Embodiment 4.

Figure 26:
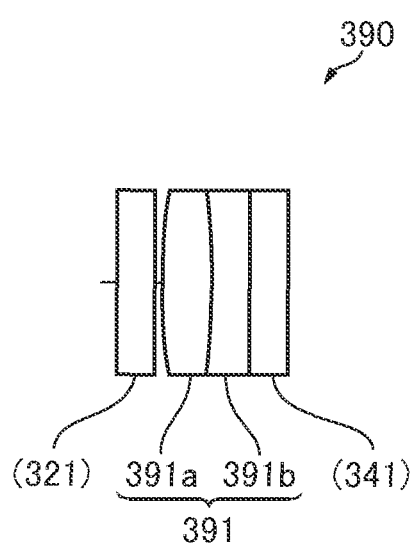
FIG. 26 is a diagram depicting a lens configuration of an imaging optical system that includes small lenses of a second modification.

A second possible modification is an imaging optical system 390 that includes a small lens 391, as illustrated in FIG. 26. This small lens 391 is constituted by a cemented lens having positive refractive power as a whole, in which a positive lens 391a having a biconvex shape and a negative lens 391b having a plano-concave shape are cemented in order from the object. And a plane parallel plate 341 is cemented to the image side surface, formed as a plane, of the negative lens 391b. In other words, in the second modification, the small lens 391 is cemented to the object side surface of the plane parallel plate 341. In the imaging optical system 390 of the second modification, the first spectral filter 321 of the spectral filter array 320 is disposed on the object side of the small lens 391, and the imaging plane 351 of the picture element 350 and the cover glass 352 (not illustrated in FIG. 26) are disposed on the image side of the small lens 391 (and plane parallel plate 341).

Figure 27:
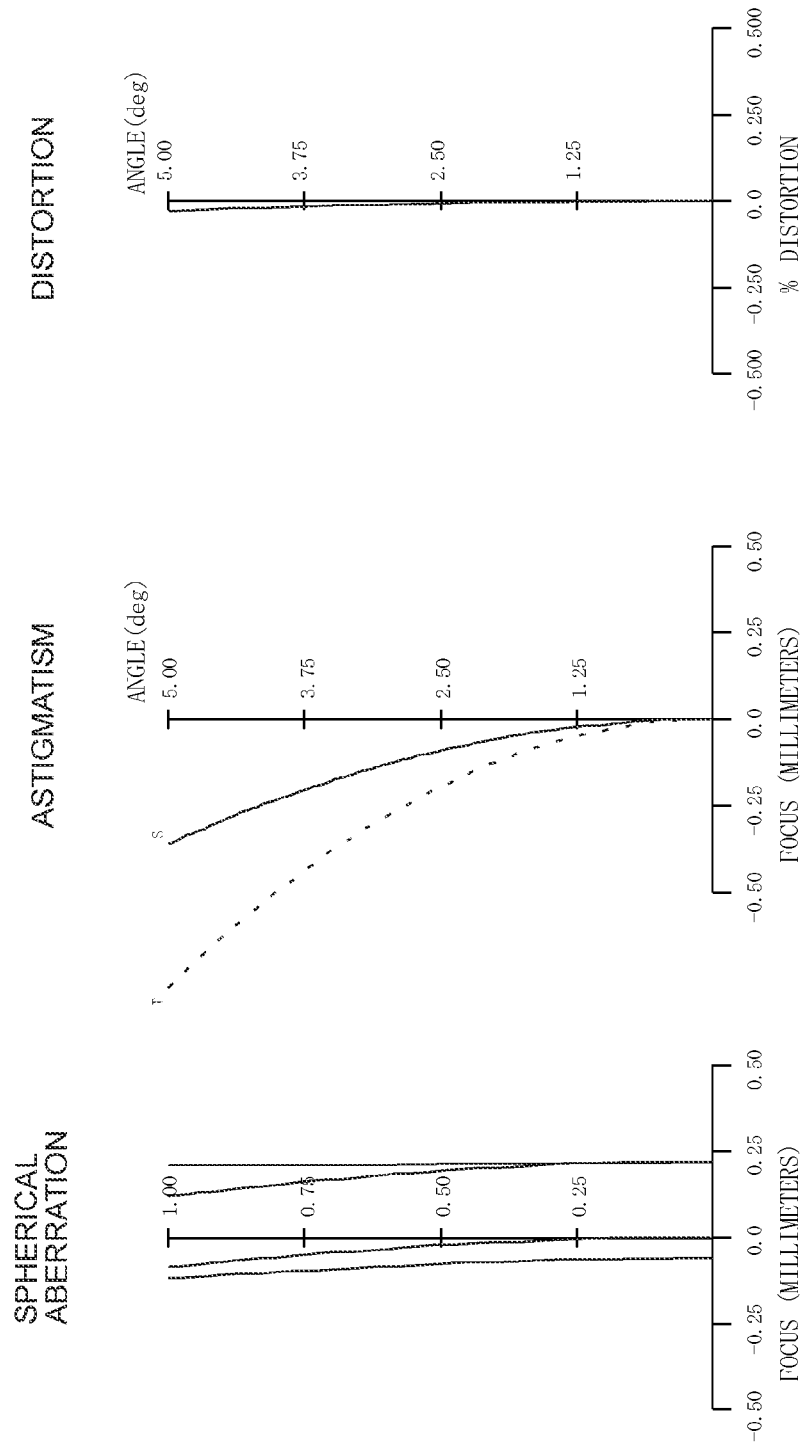
FIG. 27 are graphs showing various aberrations of the imaging optical system of the second modification.
Figure 28:
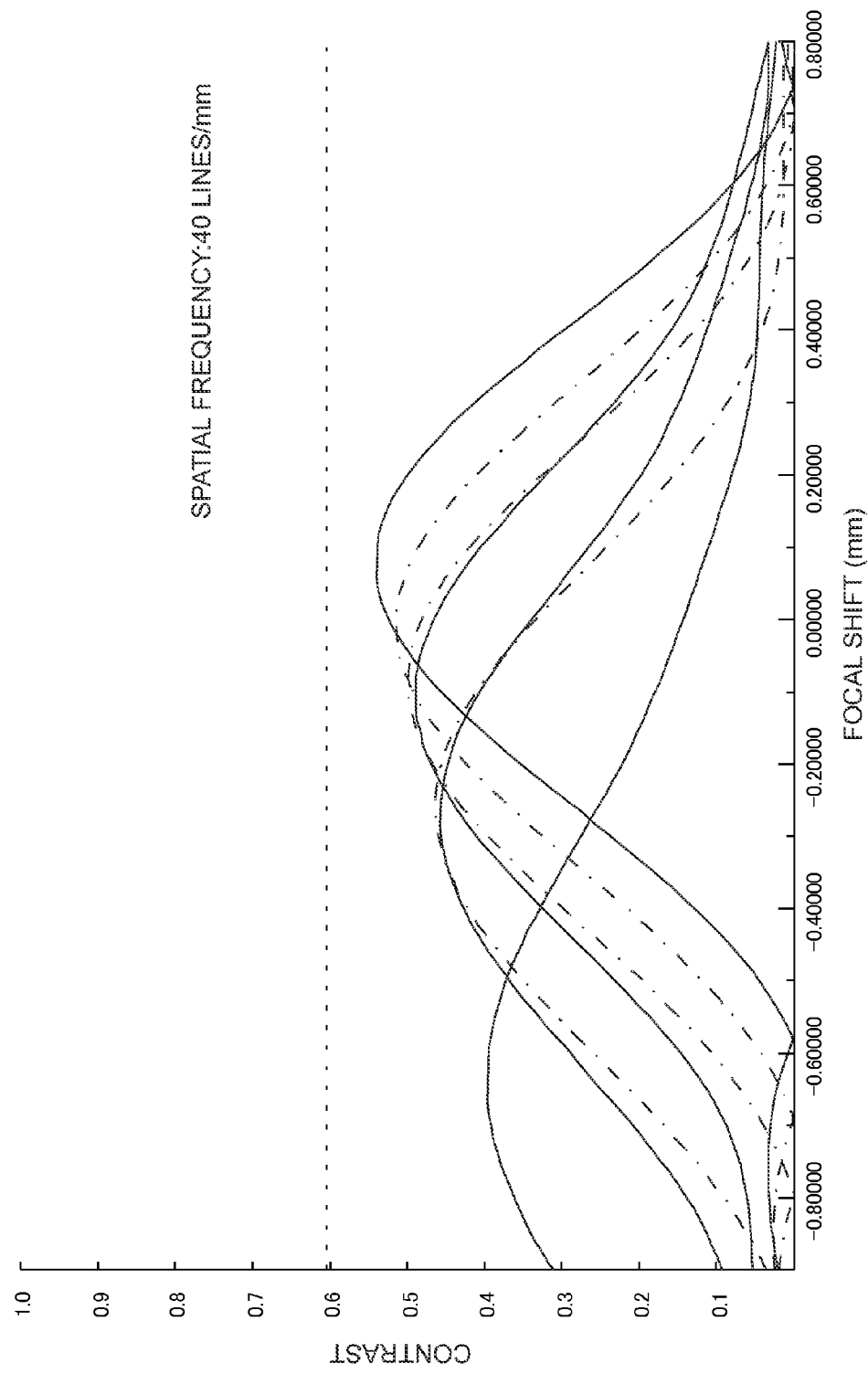
FIG. 28 is a graph depicting a relationship between MTF and focal shift in the imaging optical system of the second modification.

FIG. 27 are graphs showing various aberrations of the imaging optical system 390 of the second modification. The wavelengths used for the graphs showing various aberrations in FIG. 27 are the same as those in FIG. 21. FIG. 27 shows that the imaging optical system 390 of the second modification is not as good as the imaging optical system 340A of Embodiment 4 in terms of correcting astigmatism. FIG. 28 shows the relationship between the MTF, when the spatial frequency on the image plane is 40 lines/mm, and the focal shift in the imaging optical system 390 of the second modification. The description on the abscissa, ordinate and the like of the graph in FIG. 28 is the same as in FIG. 22. As FIG. 28 shows, the peaks of the MTF are not even in the case of the imaging optical system 390 of the second modification, compared with the imaging optical system 340A of Embodiment 4. Therefore Embodiment 4 is more appropriate for practical use than the second modification.

Figure 29:
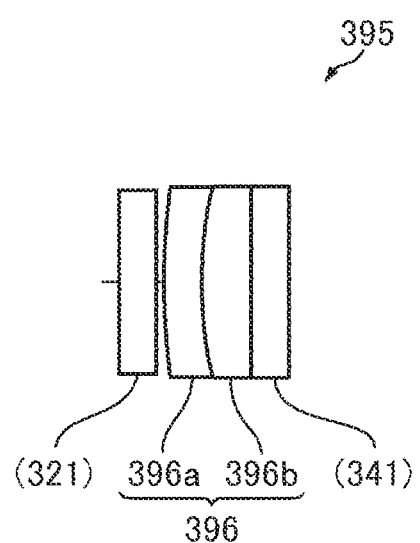
FIG. 29 is a diagram depicting a lens configuration of an imaging optical system that includes small lenses of a third modification.

A third possible modification is an imaging optical system 395 that includes a small lens 396, as illustrated in FIG. 29. This small lens 396 is constituted by a cemented lens having positive refractive power as a whole, in which a negative lens 396a having a meniscus shape which has a convex surface facing the object, and a positive lens 396b having a plano-convex shape are cemented in order from the object. And a plane parallel plate 341 is cemented to the image side surface, formed as a plane, of the positive lens 396b. In other words, in the third modification as well, the small lens 396 is cemented to the object side surface of the plane parallel plate 341. In the imaging optical system 395 of the third modification, the first spectral filter 321 of the spectral filter array 320 is disposed on the object side of the small lens 396, and the imaging plane 351 of the picture element 350 and the cover glass 352 (not illustrated in FIG. 29) are disposed on the image side of the small lens 396 (and the plane parallel plate 341).

Figure 30:
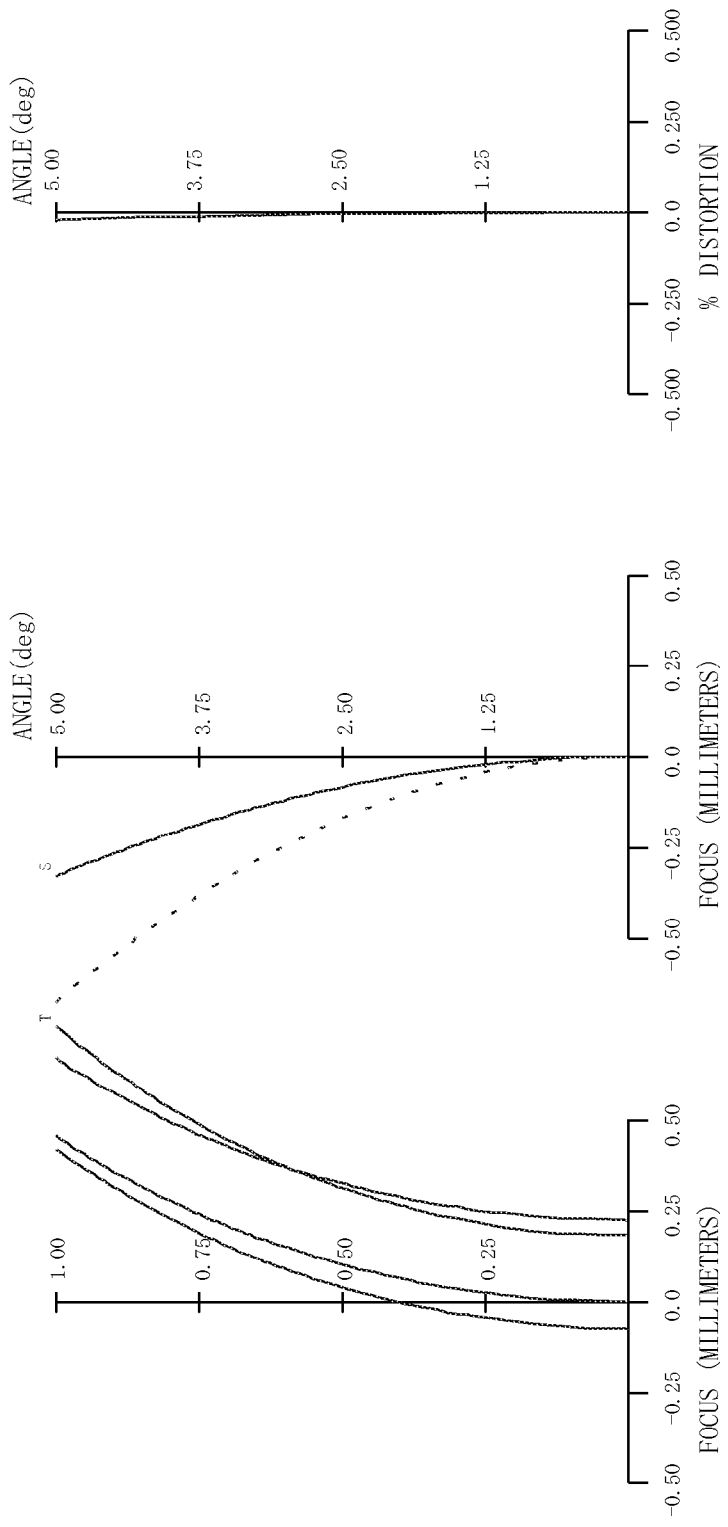
FIG. 30 are graphs showing various aberrations of the imaging optical system of the third modification.
Figure 31:
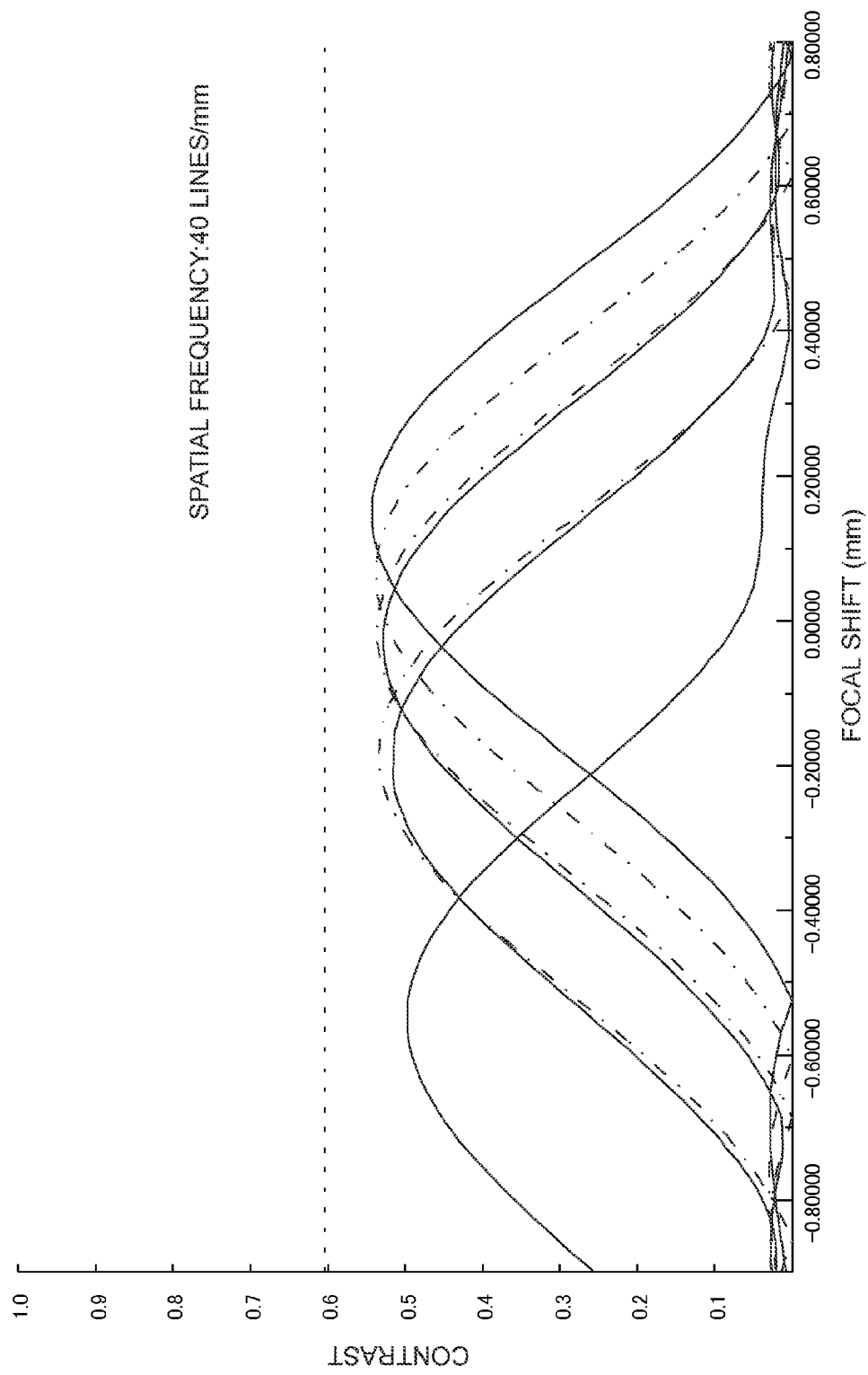
FIG. 31 is a graph depicting a relationship between MTF and focal shift in the imaging optical system of the third modification.

FIG. 30 are graphs showing various aberrations of the imaging optical system 395 of the third modification. The wavelengths used for the graphs showing various aberrations in FIG. 30 are the same as those in FIG. 21. FIG. 30 shows that the imaging optical system 395 of the third modification is not as good as the imaging optical system 340A of Embodiment 4 in terms of correcting astigmatism. FIG. 31 shows the relationship between the MTF when the spectral frequency on the image plane is 40 lines/mm and the focal shift in the imaging optical system 395 of the third modification. The description on the abscissa, ordinate and the like of the graph in FIG. 31 is the same as in FIG. 22. As FIG. 31 shows, the peaks of the MTF are not even in the case of the imaging optical system 395 of the third modification, compared with the imaging optical system 340A of Embodiment 4. Therefore Embodiment 4 is more appropriate for practical use than the third modification.

As described above, the imaging optical system in which the small lens is cemented to the object side surface of the plane parallel plate 341 is not as good as the imaging optical system 340A, in which the small lens 331 is cemented to the image side surface of the plane parallel plate 341 in terms of correcting astigmatism and maintaining good resolution performance. This means that in the imaging optical system 340A of Embodiment 4, the first small lens 331 that is cemented to the image side surface of the plane parallel plate 341 also contributes to the correction of aberrations (that is also the same for the second small lens 332 to the ninth small lens 339). In the first modification to the third modification, the aperture stop is disposed on the object side surface of the first spectral filter 321 (the frame 371a of the spectral filter array 320).

Similarly to Embodiment 1, in Embodiment 4, the second lens group 12 in the front optical system 10 may be the focusing lens group, or both the first lens group 11 and the second lens group 12 may be the focusing lens group. The front optical system 10 may be a single focus lens of which focal length is fixed, or a zoom lens of which focal length is variable.

Similarly to Embodiment 1, in Embodiment 4, the positions of the first lens group 11 having negative refractive power and the second lens group 12 having positive refractive power in the front optical system 10 may be reversed. The front optical system 10 may be constituted by, in order from the object, a first lens group having positive refractive power, a second lens group having negative refractive power, and a third lens group having positive refractive power, where the second lens group is configured to be the focusing lens group. Furthermore, the front optical system may be constituted by, in order from the object, a first lens group having positive refractive power, a second lens group having negative refractive power, a third lens group having negative refractive power, and a fourth lens group having positive refractive power, where the second lens group and the fourth lens group are configured to be the focusing lens group. In Embodiment 4, the front optical system 110 according to Embodiment 2 may be used instead of the front optical system 10 according to Embodiment 1.

Now Embodiment 5 of the imaging device will be described with reference to FIG. 32. The imaging device 401 of Embodiment 5 has a front optical system 410, a spectral filter array 320, a small lens array 330, a partition member 345, a picture element 350 and an image processor 60. The spectral filter array 320, the small lens array 330, the partition member 345, the picture element 350 and the image processor 60 have configurations similar to those of Embodiment 4, and therefore are denoted with the same reference numerals as Embodiment 4, for which detailed description is omitted. The front optical system 410 is housed inside a lens barrel 402. The spectral filter array 320, the small lens array 330, the partition member 345, the picture element 350 and the image processor 60 are housed inside a camera body 403. The lens barrel 402 that houses the front optical system 410 is detachably/replaceably attached to the camera body 403. Thereby an optimum front optical system 410 can be attached in accordance with the angle of view and the photographing distance of the imaging device 401.

The front optical system 410 is constituted by, in order from the object along the optical axis Ax, a first lens 411 having a meniscus shape which has a concave surface facing the object, a second lens 412 having a biconvex shape, a third lens 413 having a biconcave shape, and a fourth lens 414 having a plano-convex shape. The front optical system 410 has a function of a collimator that collimates the luminous flux from the focused object OB11 into a parallel luminous flux. In other words, a virtual image of the object OB11 is formed at infinity by the front optical system 410.

The spectral filter array 320 is disposed on the image side of the front optical system 410 (fourth lens group 414). The spectral filter array 320 is detachably/replaceably attached to a holding mechanism 404 disposed inside the camera body 403. Similarly to Embodiment 4, the small lens array 330 is disposed on the image side of the spectral filter array 320, and the picture element 350 is disposed on the image side of the small lens array 330. The partition member 345 is disposed between the small lens array 330 and the picture element 350.

In the imaging device 401 of Embodiment 5, luminous flux from the focused object at a finite distance OB11 transmits through the first lens 411, the second lens 412, the third lens 413 and the fourth lens 414 of the front optical system 410, and is collimated into a parallel luminous flux when emitted from the fourth lens 414. The parallel luminous flux emitted from the front optical system 410 passes one of the first spectral filter 321 to the ninth spectral filter 329 (not illustrated in FIG. 32) of the spectral filter array 320, and reaches the small lens array 330. Each of the first small lens 331 to the ninth small lens 339 (not illustrated in FIG. 32) of the small lens array 330 receives the luminous flux that passed the first spectral filter 321 to the ninth spectral filter 329 respectively, and forms an image of the object OB11 independently from one anther.

The luminous flux from the focused object OB1 has been collimated into a parallel luminous flux when entering the spectral filter array 320 by the front optical system 410, hence all of the nine object images formed by the small lenses 331 to 339 are positioned on the same plane (focal plane). In other words, because of the function of the front optical system 410, the object OB11 looks, when viewed from the small lens array 330, as if the object OB11 exists at infinity. Therefore no parallax is generated among the nine images of the object OB11 formed by the first small lens 331 to the ninth small lens 339 respectively.

Figure 33:
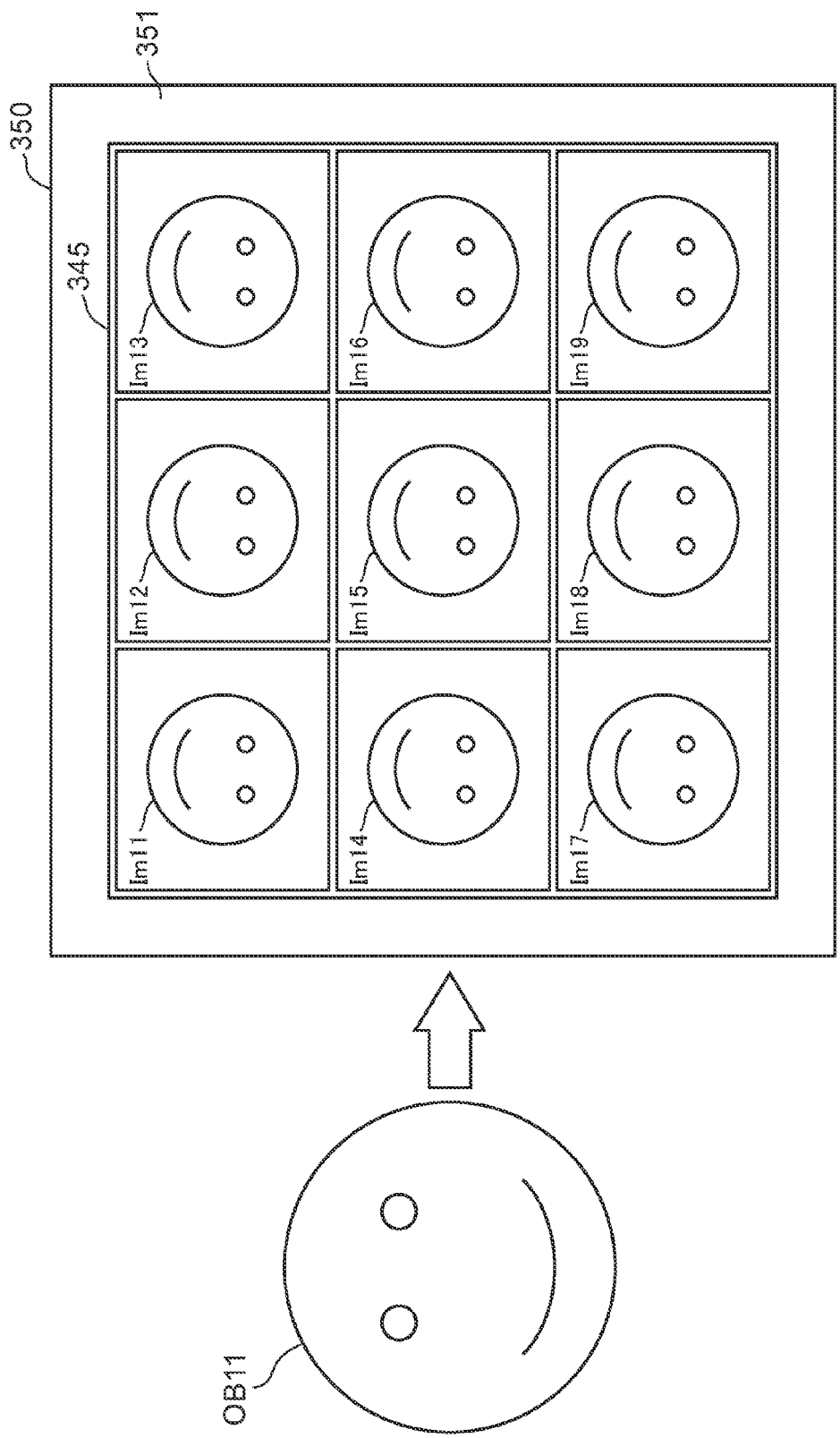
FIG. 33 is a schematic diagram depicting an object image on the imaging plane when a partition member exists.

The nine object images Im11 to Im19 formed on the imaging plane 351 (see FIG. 33) are generated with spectral characteristics corresponding to the first spectral filter 321 to the ninth spectral filter 329 respectively. The picture element 350 captures the nine object images Im11 to Im19 formed on the imaging plane 351, and outputs the image signals thereof to the image processor 60. Based on the image signals of the object images Im11 to Im19 according to the spectral characteristics of each spectral filter 321 to 329 output from the picture element 350, the image processor 60 generates a multi-wavelength band image of the object OB11, similarly to Embodiment 1 and Embodiment 4.

According to Embodiment 5, the small lens array 330 is disposed in the parallel luminous flux from the front optical system 410, therefore parallax is not generated among the object images which are formed by each small lens 331 to 339. As a result, image processing for the object image becomes easier, and image processing load can be decreased. Moreover, the range of the field of view does not shift among the plurality of captured object images, hence a dead angle is not generated and image information can be used efficiently.

Further, the partition member 345 is disposed between the small lens array 330 and the picture element 350. Because of this, the image forming luminous flux from each small lens 331 to 339 does not overlap with one another on the imaging plane 351, therefore cross-talk among the object images in the picture element 350 can be prevented.

Further, as the optical element array, the spectral filter array 320 is detachably held by the holding mechanism 404. Thereby the two-dimensional spectral characteristics of the object can be obtained by a single imaging process without applying load to the image processing. Moreover, the spectral filter array 320 can be replaced with a unit having different specifications in the optical characteristics, such as a different transmission wavelength of the band-pass filter (in each spectral filter 321 to 329).

Further, the front optical system 410 is detachably held by the lens barrel 402. Since the front optical system can be replaced with a unit having different magnification, imaging field of view can be changed.

Further, similarly to Embodiment 1, the relative positional relationship between the center axis of each small lens 331 to 339 and the imaging pixel (pixel of the picture element 350), with which this center axis intersects, differs depending on the small lens, whereby a super-resolution image having a resolution higher than the Nyquist frequency can be obtained.

Figure 32:
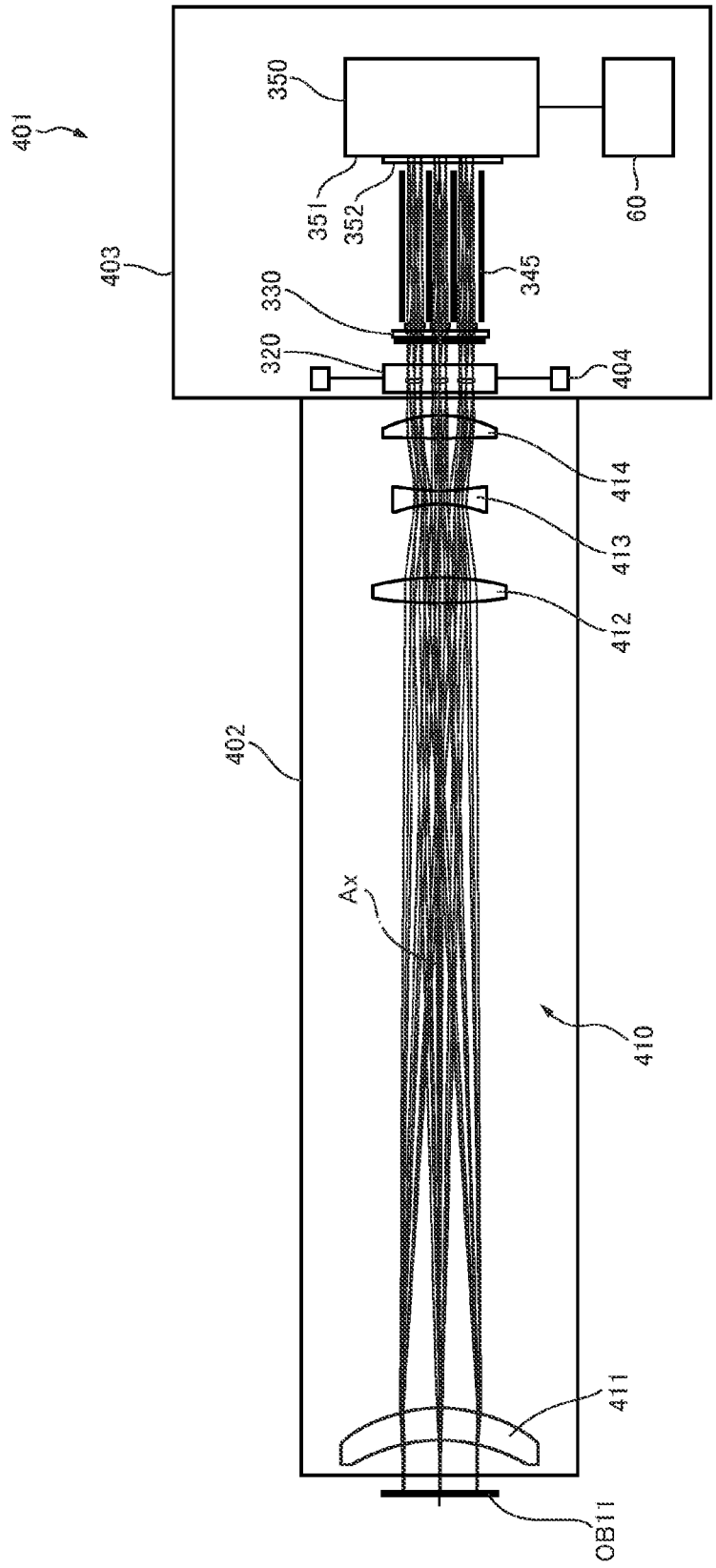
FIG. 32 is a diagram depicting a general configuration of an imaging device according to Embodiment 5.

Similarly to Embodiment 4, each of the nine small lenses 331 to 339 is constituted by a cemented lens having positive refractive power as a whole, in which the positive lens 331a and the negative lens 331b are cemented, and the plane parallel plate 341 is cemented to the object side surface of this cemented lens (not illustrated in FIG. 32). Thereby the focal points (focusing positions) of the nine imaging optical systems (small lenses 331 to 339) can be easily aligned at high accuracy, even in a multiple lens optical system. Moreover, the aperture diameter can be increased with decreasing the intervals among the nine small lenses 331 to 339, so as to secure maximum quantity of imaging light.

Further, similarly to Embodiment 4, nine aperture stops are disposed on the surfaces on which the nine spectral filters 321 to 329 are disposed, in appropriate object side positions of each small lens 331 to 339. Therefore various aberrations, such as astigmatism, can be satisfactorily corrected.

Further, similarly to Embodiment 4, in the cemented lens constituting each small lens 331 to 339, chromatic aberration has been corrected to be in a predetermined wavelength range (e.g. 380 nm to 1000 nm). Therefore the spectral filter can be replaced with a unit having any spectral characteristics within the predetermined wavelength range. In the cemented lenses constituting the nine small lenses 331 to 339, various aberrations other than chromatic aberration have also been sufficiently corrected for practical use, hence high resolution performance can be obtained.

In Embodiment 5, luminous flux that travels from an arbitrary focused object point to the small lens array 330 are nine independent luminous fluxes, but this optical system is configured to be an object side telecentric system, regarding these nine luminous fluxes as one luminous flux that includes these nine. Since the object side NA (Numerical Aperture) is small, all rays emitted from any object point are substantially perpendicular to the object surface. Therefore in the case when the nine optical elements disposed in the optical element array are constituted by polarizing filters and band-pass filters, such as the case of Embodiment 3, the angle of viewing the object from the small lens array 330 becomes substantially 90° regardless the object point and the wavelength band, which means that the polarizing direction is hardly shifted by viewing the object diagonally.

In Embodiment 5, at least one lens of the front optical system 410 may be configured to be movable along the optical axis Ax as a focusing lens group, similarly to Embodiment 4.

In Embodiments 1 to 5, the relative positional relationship between the center axis of each small lens 31 to 39 (331 to 339) and the imaging pixel with which this center axis intersects differs depending on each small lens, but the present invention is not limited to this. For example, the nine small lenses may be disposed three rows by three columns at each lattice point which is arrayed vertically and horizontally at equal intervals. In this case, the image processor generates the multi-wavelength band image of the object individually based on the image signals of the nine object images output from the picture element.

In Embodiments 1 to 5 described above, the imaging wavelength range can be set to a desired wavelength band, such as the ultra-violet region, visible region and infrared region.

EXPLANATION OF NUMERALS AND CHARACTERS

1 imaging device (Embodiment 1)
3 lens barrel
4 holding mechanism
10 front optical system
11 first lens group (negative lens group)
12 second lens group (positive lens group)
20 spectral filter array
21 first spectral filter
22 second spectral filter
23 third spectral filter
24 fourth spectral filter
25 fifth spectral filter
26 sixth spectral filter
27 seventh spectral filter
28 eighth spectral filter
29 ninth spectral filter
30 small lens array
31 first small lens
32 second small lens
33 third small lens
34 fourth small lens
35 fifth small lens
36 sixth small lens
37 seventh small lens
38 eighth small lens
39 ninth small lens
40 partition member
50 picture element
51 imaging plane
60 image processor
101 imaging device (Embodiment 2)
102 lens barrel
110 front optical system
111 first lens group
112 second lens group
115 field stop
201 imaging device (Embodiment 3)
204 holding mechanism
220 optical element array
221 first optical element
222 second optical element
223 third optical element
224 fourth optical element
225 fifth optical element
226 sixth optical element
227 seventh optical element
228 eighth optical element
260 image processor
301 imaging device (Embodiment 4)
320 spectral filter array
321 first spectral filter
322 second spectral filter
323 third spectral filter
324 fourth spectral filter
325 fifth spectral filter
326 sixth spectral filter
327 seventh spectral filter
328 eighth spectral filter
329 ninth spectral filter
330 small lens array
331 first small lens (331a positive lens, 331b negative lens)
332 second small lens
333 third small lens
334 fourth small lens 335 fifth small lens
336 sixth small lens
337 seventh small lens
338 eighth small lens
339 ninth small lens
341 plane parallel plate
345 partition member
350 picture element
351 imaging plane
401 imaging device (Embodiment 5)
402 lens barrel
404 holding mechanism
410 front optical system
OB1 object at a finite distance
OB2 object at infinity
OB11 object
Im1 to Im9 object image
Im11 to Im19 object image

The invention claimed is:

1. An imaging device, comprising:
a front optical system that transmits light from an object;
an optical element array that is constituted by a plurality of optical elements, which is two-dimensionally arrayed along a plane perpendicular to an optical axis, and passes the light from the front optical system via the plurality of optical elements;
a small lens array that is constituted by a plurality of small lenses, which is two-dimensionally arrayed along a plane perpendicular to the optical axis and has positive refractive power, that transmits the light from the plurality of optical elements via the plurality of small lenses respectively, and that forms a plurality of object images;
a picture element that has an imaging plane on focal planes of the plurality of small lenses, and captures the plurality of object images respectively; and
an image processor that determines information on the object images according to optical characteristics of the optical elements, based on image signals output from the picture element,
the front optical system transmitting the light from the focused object to collimate the light into a parallel luminous flux,
wherein the front optical system includes a focusing lens group executing focusing operation from an obiect at infinity onto an obiect at a finite distance by moving along the optical axis, and transmits the light from the focused object to collimate the light into a parallel luminous flux.

2. The imaging device according to claim 1, further comprising a holding unit that detachably holds the optical element array.

3. The imaging device according to claim 1, further comprising a lens barrel that detachably holds the front optical system.

4. The imaging device according to claim 1, further comprising a partition member that is disposed between the small lens array and the picture element, and prevents an overlapping of light rays that reach the imaging plane from the plurality of small lenses respectively.

5. The imaging device according to claim 1, wherein
the front optical system includes a negative lens group having negative refractive power, and a positive lens group having positive refractive power, and
the focusing lens group is at least one of the negative lens group and the positive lens group.

6. The imaging device according to claim 1, wherein
the front optical system forms, inside thereof, an intermediate image of the object,
a field stop, which prevents an overlapping of light rays that reach the imaging plane from the plurality of small lenses respectively, is disposed in a position where the intermediate image is formed, and
the focusing lens group is constituted by lenses of the front optical system that are located on the object side of the field stop.

7. The imaging device according to claim 1, wherein
the plurality of small lenses is arrayed so that the relative positional relationship of a center axis of each small lens and a pixel of the picture element where the center axis crosses is different from one another among the plurality of small lenses.

8. The imaging device according to claim 1, wherein
the optical element array includes, as the plurality of optical elements, a plurality of optical filters of which spectral characteristics are different from each other, and
the image processor determines two-dimensional spectral characteristics of the object based on image signals of the object images according to the mutually different spectral characteristics, the image signals being output from the picture element.

9. The imaging device according to claim 1, wherein
the optical element array includes, as the plurality of optical elements, a first optical element that generates a first linearly polarized light, a second optical element that generates a second linearly polarized light of which polarizing direction is perpendicular to the first linearly polarized light, a third optical element that generates a third linearly polarized light of which polarizing direction is inclined 45° from the first linearly polarized light and the second linearly polarized light, and a fourth optical element that generates circularly polarized light, and
the image processor determines two-dimensional distribution of a Stokes parameter in the object image, on the basis of an image signal of the object image based on the first linearly polarized light, an image signal of the object image based on the second linearly polarized light, an image signal of the object image based on the third linearly polarized light, and an image signal of the object image based on the circularly polarized light, the image signals being output from the picture element.

10. The imaging device according to claim 1, wherein
the plurality of small lenses is arrayed so that focal planes of the plurality of small lenses are formed on a same plane respectively.

11. The imaging device according to claim 1, wherein
the small lens is constituted by a cemented lens in which a positive lens and a negative lens of which refractive index is higher and Abbe number is smaller than the positive lens are cemented, and which has a positive refractive power as a whole,
the cemented lens is configured such that chromatic aberration is corrected in a predetermined wavelength range,
one of an object side surface and an image side surface of the cemented lens is formed in a plane shape, and
a plane parallel plate which extends along a plane perpendicular to the optical axis is cemented to the one surface of each of the plurality of cemented lenses.

12. The imaging device according to claim 11, wherein
the object side surface of the cemented lens is formed in a plane shape, and the plane parallel plate is cemented to the object side surface of each of the plurality of cemented lenses.

13. The imaging device according to claim 11, wherein an aperture stop is disposed on a plane where the plurality of optical elements is disposed.

* * * * *